United States Patent
McGee et al.

(10) Patent No.: US 9,965,013 B1
(45) Date of Patent: May 8, 2018

(54) SWITCHGEAR CONTROLLER DEVICE

(71) Applicant: Amazon Technologies, Inc., Reno, NV (US)

(72) Inventors: Nigel Martin McGee, Ashburn, VA (US); Martin John O'Grady, Castleblayney (IE); Patrick Hughes, Enfield (IE)

(73) Assignee: Amazon Technologies, Inc., Reno, NV (US)

( * ) Notice: Subject to any disclaimer, the term of this patent is extended or adjusted under 35 U.S.C. 154(b) by 753 days.

(21) Appl. No.: 14/219,976

(22) Filed: Mar. 19, 2014

(51) Int. Cl.
*H02J 9/00* (2006.01)
*G06F 1/30* (2006.01)

(52) U.S. Cl.
CPC ....................... *G06F 1/30* (2013.01)

(58) Field of Classification Search
CPC ........................................................ G06F 1/30
USPC ............................................................ 307/64
See application file for complete search history.

(56) References Cited

U.S. PATENT DOCUMENTS

| | | | |
|---|---|---|---|
| 2006/0220462 A1* | 10/2006 | O'Leary | H02J 9/062 307/44 |
| 2007/0242402 A1 | 10/2007 | Papallo et al. | |
| 2008/0086222 A1 | 4/2008 | Kagan | |
| 2008/0150363 A1* | 6/2008 | Kuo | H02J 9/06 307/64 |
| 2008/0313006 A1 | 12/2008 | Witter et al. | |
| 2009/0021078 A1 | 1/2009 | Corhodzic et al. | |
| 2009/0021079 A1* | 1/2009 | Johnson, Jr. | H02J 9/062 307/68 |
| 2009/0150818 A1* | 6/2009 | Bakhreiba | G06F 1/30 715/771 |
| 2012/0074794 A1* | 3/2012 | Morales | G06F 1/26 307/147 |
| 2013/0116946 A1* | 5/2013 | Familiant | H02J 3/00 702/58 |

(Continued)

OTHER PUBLICATIONS

ASSO Power Technologies, Suggested Specification for ASCO 7000 Series Soft Load Transfer Switch, Mar. 2003, pp. 1-17.*

(Continued)

*Primary Examiner* — Hal Kaplan
*Assistant Examiner* — Toan Vu
(74) *Attorney, Agent, or Firm* — Robert C. Kowert; Meyertons, Hood, Kivlin, Kowert & Goetzel, P.C.

(57) ABSTRACT

A power distribution system that distributes power to electrical loads includes a switchgear apparatus that selectively routes power from one of two or more feeds to downstream portions of the system based upon commands received from a separate external switchgear controller device that receives data from various portions of the power distribution system. The switchgear controller device can operate in one or more separate operating modes, where commands to the switchgear apparatus are generated based upon user inputs or determinations made by an internal switchgear control module based at least in part upon the selected operating mode of the switchgear controller device. The operating mode can be set based upon user interaction with an operating mode interface. The switchgear control module may generate switchgear operation commands based at least in part upon data received from the switchgear apparatus and various portions of the power distribution system.

20 Claims, 17 Drawing Sheets

(56) References Cited

U.S. PATENT DOCUMENTS

2014/0281649 A1    9/2014  Zajkowski
2014/0309802 A1*  10/2014  Monahan ................. H02J 9/06
                                                    700/297

OTHER PUBLICATIONS

GENERAC, PowerManager System Controller (PM-SC), Sep. 2011, pp. 1-50.*
ASSO PowerQuest Power Monitoring and Control Systems, Dec. 2011, pp. 1-18.*
ABB, "IEC 61850 in ZX Gas-insulated Medium Voltage Switchgear", 2010, pp. 1-6.
Siemens, "Switchgear Type 8BT1, up to 24 kV, air-insulated; Medium Voltage Switchgear", 2012, pp. 1-16.
ABB, "ZX0.2 Gas-insulated medium voltage switchgear", 2010, pp. 1-4.
ABB, "ZX0.2 for OEM partners Gasinsulated medium voltage switchgear" 2011, pp. 1-6.
U.S. Appl. No. 14/219,980, filed Mar. 19, 2014, Nigel Martin McGee.

* cited by examiner

| | | | | | | |
|---|---|---|---|---|---|---|
| DATA CENTER ENGINEERING | | 29 November 2013 16:42:28 | | Return To Main | | |
| DI-000 | Utility Supply Voltage | Healthy | DO-000 | Open Utility Breaker | Off |
| DI-001 | Generator Supply Voltage | Healthy | DO-001 | Close Utility Breaker | Off |
| DI-002 | Generator Supply Frequency | Healthy | DO-002 | Open Generator Breaker | Off |
| DI-003 | Busbar Voltage Monitor | Healthy | DO-003 | Close Generator Breaker | Off |
| DI-004 | Generator Running | Stopped | DO-004 | Generator Start Signal | On |
| DI-005 | Generator Failed | Healthy | DO-005 | PLC In Auto-Failure | Off |
| DI-006 | Generator In Auto | Manual | DO-006 | PLC Watchdog | Off |
| DI-007 | Generator Emergency Stop | E Stop Operated | DO-007 | Dead Bus Alarm | Off |
| DI-008 | Panel Switch Manual Selected | Not in Manual | DO-008 | Generator On Load | On |
| DI-009 | Panel Switch Off/Reset Selected | Not in Off/Reset | DO-009 | Spare | On |
| DI-010 | Panel Switch Auto Selected | Not in Auto | DO-010 | Spare | On |
| DI-011 | Utility Breaker Closed | Open | DO-011 | Spare | On |
| DI-012 | Utility Breaker Tripped | Tripped | | | |
| DI-013 | Utility Breaker Racked-In | Withdrawn | | | |
| DI-014 | Generator Breaker Closed | Open | | | |
| DI-015 | Generator Breaker Tripped | Healthy | | | |
| DI-016 | Generator Breaker Racked-In | Withdrawn | | | |
| DI-017 | Spare | Healthy | | | |
| DI-018 | UPS on Battery | Healthy | | | |
| DI-019 | UPS on Bypass | Healthy | | | |

FIG. 7C

SWITCHGEAR CONTROLLER DEVICE

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 110V). A network of cabling, bus bars, power connectors, and power distribution units, is used to deliver the power at the lower voltage to numerous specific components in the facility.

Some data centers include back-up components and systems to provide back-up power to servers in the event of a failure of one or more source power feeds to a power system. In some data centers, back-up power source provides back-up power, and a switchgear apparatus switches between routing either the utility or back-up power to the servers. Various switchgear apparatuses may be manufactured with various internal control modules that determine whether to switch between power feeds based on various conditions. Such various switchgear apparatuses, as a result, may operate differently in common circumstances, potentially complicating predictability of power distribution operations and presenting a risk of unforeseen and undesirable performance of switching operations. Such performance could lead to loss of power to the servers, leading to down-time which may result in a significant loss in computing resources. In some critical systems such as hospital equipment and security systems, down-time may result in significant disruption and, in some cases, adversely affect health and safety.

BRIEF DESCRIPTION OF THE DRAWINGS

FIG. 7C illustrates a human machine interface of the switchgear controller device, where the interface presents at least a graphical representation of a map of inputs and outputs associated with the switchgear controller device.

Figure 1:
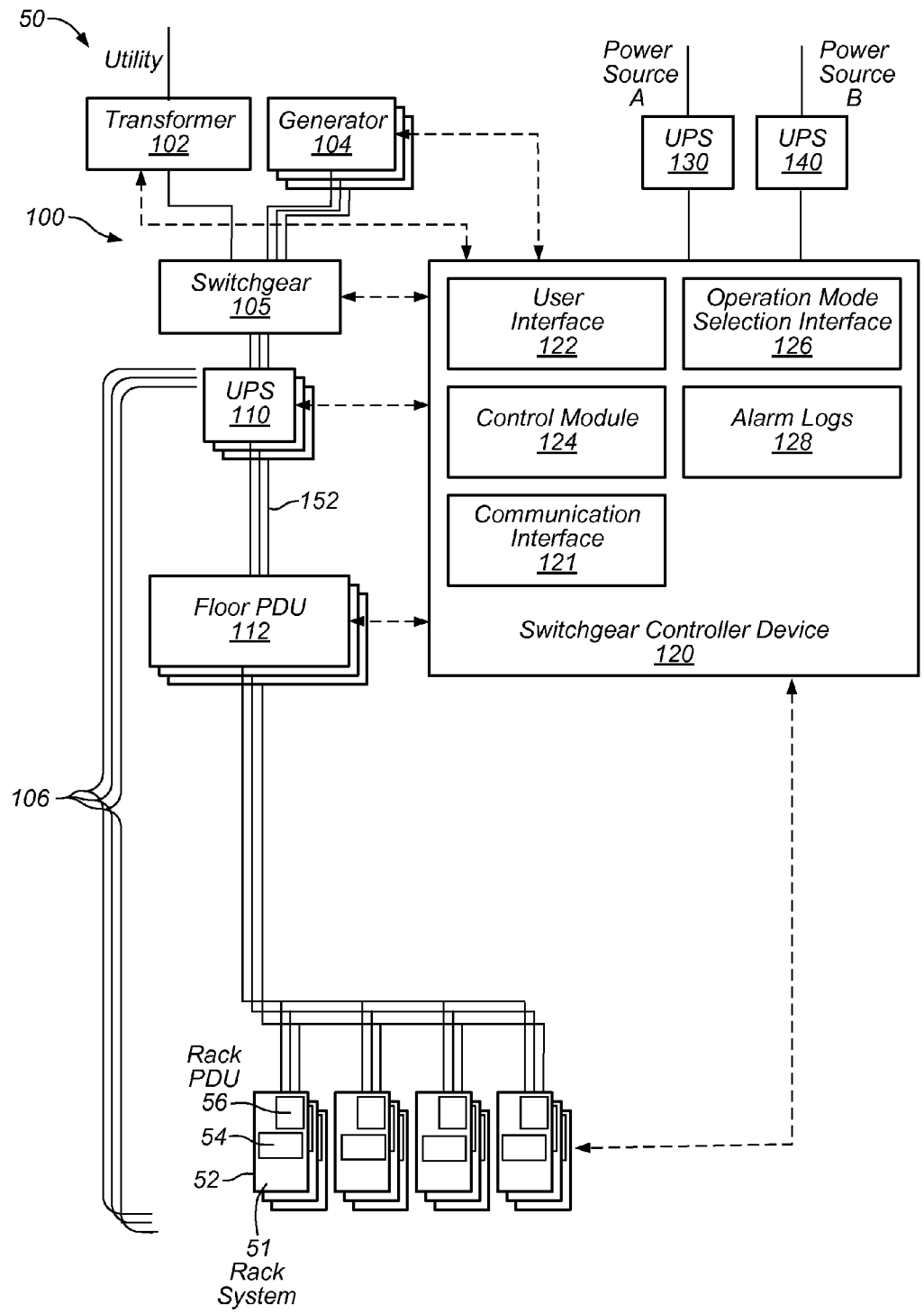
FIG. 1 is a block diagram illustrating a data center, including a power distribution system including a switchgear apparatus and a separate switchgear controller device, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of power distribution systems, and various components included therein, are disclosed. According to one embodiment, a system for performing computing operations in a data center includes one or more computing systems that can perform computing operations, a utility power transformer that can transform and supply a utility power feed received from a utility power source, a back-up power source that can supply a back-up power feed, a switchgear apparatus that can selectively route one of the utility power feed or the back-up power feed to the one or more computing systems, and a switchgear controller device that is separate from the switchgear apparatus and is communicatively coupled to at least the switchgear apparatus. The switchgear apparatus can selectively route one of the power feeds based exclusively upon one or more received operating commands from the switchgear controller device. The switchgear controller device can selectively switch between two or more particular operating modes. In one operating mode, the switchgear controller device transmits operating commands to the switchgear apparatus based at least in part upon a switchgear control module device and independent of any commands from a user. In another operating mode, the switchgear controller device transmits operating commands to the switchgear apparatus based exclusively upon one or more commands received from a user via a user interface and independent of the switchgear control module device.

According to one embodiment, an apparatus includes a switchgear controller device that is communicatively coupled to at least an external switchgear apparatus. The switchgear controller device can transmit operating commands to the external switchgear apparatus to command the external switchgear apparatus to switch between routing one of at least two separate power feeds to a downstream electrical load. The switchgear controller device can include a user interface, a switchgear control module device, and an operating mode selection interface. The user interface can receive user-initiated commands associated with at least the switchgear controller device. The switchgear control module device can make determinations regarding the state of the at least two separate power feeds received at the external switchgear apparatus, based at least in part upon data received from the switchgear apparatus. The operating mode selection interface can selectively switch the switchgear controller device between separate operating modes based at least in part upon a user-initiated command. In a particular operating mode, the switchgear controller device transmits operating commands to the external switchgear apparatus based at least in part upon determinations made by the switchgear control module device and independent of any user-initiated commands. In another particular operating mode, the switchgear controller device transmits operating commands to the external switchgear apparatus based exclusively upon one or more user-initiated commands received via a user interface and independent of the switchgear control module device.

According to one embodiment, a method includes receiving a selection of either a manual operating mode or an automatic operating mode at a switchgear controller device that is communicatively coupled to an external switchgear apparatus in a power distribution system and configuring the switchgear controller device based upon the operating mode selected. Based at least in part upon receiving a selection of the automatic operating mode, the switchgear controller device is configured to transmit operating commands to the external switchgear apparatus, to command the external switchgear apparatus to switch between routing one of at least two separate power feeds to a downstream electrical load, based at least in part upon received data associated with at least one portion of the power distribution system and independent of any user-initiated commands. Based at least in part upon receiving a selection of the manual operating mode, the switchgear controller device is configured to transmit operating commands to the external switchgear apparatus, to command the external switchgear apparatus to switch between routing one of at least two separate power feeds to a downstream electrical load, based exclusively upon one or more user-initiated commands received via another user interface and independent of the switchgear control module device. The selection of operating mode is received based at least in part upon a user-initiated interaction with a user interface associated with the switchgear controller device.

According to one embodiment, a system for performing computing operations in a data center includes one or more computing systems that can perform computing operations and a power distribution system that distributes operating power to the one or more computing systems. The power distribution system includes a switchgear apparatus that, based upon one or more received operating commands, selectively routes one of a utility power feed or a back-up power feed to the one or more computing systems, an upstream portion, located upstream of the switchgear apparatus, a downstream portion, located downstream of the switchgear apparatus and upstream of the one or more computing systems, and a switchgear controller device. The switchgear controller device is separate from, and communicatively coupled to, the switchgear apparatus and includes a communication interface and a human machine interface (HMI). The communication interface receives data signals from at least a portion of each of the upstream and downstream portions, where the data signals indicate one or more present configurations of at least one power distribution component comprised in the respective one of the upstream portion and the downstream portion of the power distribution system. The HMI, based at least in part upon the received data signals, provides a graphical representation of the power distribution system to a user, where the graphical representation includes a graphical representation of a present configuration of at least one power distribution component in each of the upstream portion and the downstream portion of the power distribution system.

According to one embodiment, an apparatus includes a switchgear controller device that is communicatively coupled to at least an external switchgear apparatus in a power distribution system and a downstream portion of the power distribution system that is downstream from the switchgear apparatus. The switchgear controller device can transmit operating commands to the external switchgear apparatus to command the external switchgear apparatus to switch between routing one of at least two separate power feeds to a downstream electrical load. The switchgear controller device can include a user interface that can present a graphical representation of the power distribution system to a user. The graphical representation includes a graphical representation of a present configuration of the switchgear apparatus and a graphical representation of a present configuration of at least one downstream power distribution system component in the downstream portion of the power distribution system.

According to one embodiment, a non-transitory computer-readable medium storing a computer-executable program of instructions that, when executed by a computer, instruct the computer to determine, based at least in part upon receipt of data from a switchgear apparatus in a power distribution system that is configured to selectively route one of at least two power feeds to a downstream electrical load, a present configuration of at least a portion of the switchgear apparatus, determine, based at least in part upon receipt of data from a downstream portion of the power distribution system that is downstream of the switchgear apparatus in the power distribution system, a present configuration of at least one power distribution component in the downstream portion and display, on a user interface of a switchgear controller device communicatively coupled with the switchgear apparatus, a graphical representation of the power distribution system. The graphical representation includes a graphical representation of the present configuration of at least the portion of the switchgear apparatus and a graphical representation of the present configuration of the at least one power distribution component in the downstream portion.

As used herein, "computer room" means a room of a building in which computer systems, such as rack-mounted servers, are operated.

As used herein, "computer system" includes any of various computer systems or components thereof. Some examples of a computer system include a rack-mounted server, a switchgear control module, etc. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "operating power" means power that can be used by one or more computer system components. Operating power may be stepped down in a power distribution unit or in elements downstream from the power distribution units. For example, a server power supply may step down operating power voltages (and rectify alternating current to direct current).

As used herein, a "cable", "cabling", etc. includes any cable, conduit, or line that carries one or more conductors and that is flexible over at least a portion of its length. A cable may include a connector portion, such as a plug, at one or more of its ends.

As used herein, one component in a power distribution system is "downstream" from another component in the system if the one component receives power from the other component or is at a lower level in the system than the other component. For example, an uninterruptible power supply (UPS) unit may be downstream from a switchgear apparatus.

As used herein, "load", includes the output of a power distribution system and the electrical power consumed by some or all of the power distribution system, including the output. For example, a load of a power distribution system may include a computing facility that consumes power distributed over the power distribution system from a power source.

As used herein, a "module" is a component or a combination of components. A module may include functional elements and systems, such as computer systems, circuit boards, racks, blowers, ducts, and power distribution units, as well as structural elements, such a base, frame, housing, or container.

As used herein, a "power feed" includes power from any source, including but not limited to power received from a utility power source that can be supplied to one or more power distribution components in a power distribution system, including an electrical load of the power distribution system.

As used herein, "power distribution unit" means any device, module, component, or combination thereof, which can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.). A power distribution unit may include a transformer, power monitoring, fault detection, isolation, etc.

As used herein, "primary power" means any power that can be supplied to an electrical load, for example, during normal operating conditions.

As used herein, "reserve power" and "back-up power" may refer interchangeably to power that can be supplied to an electrical load upon the failure of, or as a substitute for, primary power to the load. For example, a power feed from a back-up generator may include back-up power.

As used herein, "signal" includes an electrical or electromagnetic impulse, wave, tone, pulse, or combination thereof. A signal may serve to indicate, identify, inform, direct, instruct, command, or warn. A signal may be a discrete set of information (for example, a sequence of characters in a message), continuous (such as a wave), periodic, or a combination thereof. A signal may have any of various regular or irregular characteristics. A signal can be applied to, or transmitted through, a single conductor or to a set of two or more conductors. In some embodiments, a signal is an electromagnetic signal transmitted through air (for example, a wireless signal). In some embodiments, a signal has characteristics of another signal. For example, a circuit may include a current, produced by an instrument transformer, which is a reduced current that is proportional to a full current in another circuit by a known or predetermined factor, such that the reduced current in the first circuit can be used to determine the full current in the other circuit.

As used herein, "switchgear" includes electrical switching devices, fuses, circuit breakers, or combinations thereof used to isolate components in an electrical system. Switchgear can isolate downstream components from upstream power feeds. In some embodiments, switchgear isolates components to protect the equipment from electrical faults elsewhere in an electrical system. For example, switchgear in a computing facility may include one or more circuit breakers that can isolate various electrical and computing systems in the facility from upstream power feeds.

As used herein, one component in a power distribution system is "upstream" from another component in the system if the one component supplies power to the other component or is at a higher level in the system than the other component. For example, a utility transformer supplying utility power to a switchgear apparatus may be upstream from the switchgear apparatus, or a switchgear apparatus may be upstream from a UPS.

In some embodiments, a switchgear controller device controls switching operations of a separate external switchgear apparatus in a power distribution system. One or more computer systems that make determinations regarding commanding the switchgear apparatus to perform switching operations that include switching power feeds at the switchgear apparatus may be absent from the switchgear apparatus and located in the switchgear controller device. The switchgear apparatus may perform switching operations based at least in part upon receiving switchgear operation commands from the switchgear controller device, where the received switchgear operation commands include one or more commands to perform one or more switching operations. For example, where the switchgear apparatus performs open-transition switching operations, where one circuit breaker of one feed is opened before another circuit breaker of another feed is closed, a received switchgear operation command may include a command to open a particular circuit breaker and another separate command to close a particular circuit breaker.

In some embodiments, the switchgear controller device generates switchgear operation commands based at least in part upon various inputs. Which inputs are used to generate the switchgear operation commands is based at least in part upon which operating mode to which the switchgear controller device is set.

The switchgear controller device may receive data from various portions of a power distribution system, including data associated with one or more various power distribution components located in the respective portions, and, based at least in part upon the received data, present a graphical representation of the various portions of the power distribution system in a human machine interface (HMI) of the switchgear controller device. Based upon a selected operating mode of the switchgear controller device, the data may be used by one or more portions of a switchgear control module in the switchgear controller device to determine to generate one or more particular output signals, including particular operation commands to particular external components, systems, etc. to perform particular operations. Based upon the selected operating mode, commands to the switchgear apparatus may be generated exclusively based upon user commands received via user-initiated interactions with the various interfaces of the switchgear controller device, including the HMI. In some embodiments, the graphical representation of the power distribution system portions may be at least partially interactive ("semi-interactive"), where a user can provide user commands to the switchgear controller device to generate particular output signals based at least in part upon user-initiated interaction with various interactive graphical representations displayed in the interface.

FIG. 1 is a block diagram illustrating a data center, including a power distribution system including a switchgear apparatus and a separate switchgear controller device, according to some embodiments. Data center 50 includes rack systems 51 and primary power side 100. Primary power side 100 includes transformer 102, generators 104, and switchgear apparatus 105, and primary power systems 106. Rack systems 51 include racks 52. Sets of computer systems 54 in racks 52 may perform computing operations in data center 50. Computer systems 54 may be, for example, servers in a server room of data center 50. Computer systems 54 in racks 52 may each receive power from one of primary power systems 106. In one embodiment, each of primary power systems 106 corresponds to, and provides power to, the servers in one room in data center 50. In one embodiment, each of primary power systems 106 corresponds to, and provides power to, one of rack systems 51 in data center 50.

Primary power systems 106 each include UPS 110 and floor power distribution unit 112. Floor power distribution unit 112 provides power to various rack systems 51. In some embodiments, floor power distribution unit 112 includes a transformer that transforms the voltage from switchgear 105. Each of rack systems 51 may include a rack power distribution unit 56. Rack power distribution units 56 may distribute power to computer systems 54.

Transformer 102 is coupled to a utility power feed. The utility power feed may be a medium voltage feed. In certain embodiments, the utility power feed is at a voltage of about 13.5 kilovolts or 12.8 kilovolts at a frequency of about 60 Hz. Generators 104 may provide power to primary power systems 106 in the event of a failure of utility power to transformer 102. In one embodiment, one of generators 104 provides back-up power for each of primary power systems 106. UPS 110 may provide uninterrupted power to racks 52 in the event of a power failure upstream from UPS 110.

For illustrative purposes, three primary power systems are shown in FIG. 1 (for clarity, details of only the front primary power system 106 are shown). The number of primary power systems 106 on primary power side 100 may vary, however. In certain embodiments, a primary power side may include only one primary power system. In addition, the number of power distribution units, UPSs, switchgear apparatus may vary from embodiment to embodiment (and, within a given embodiment, from system to system). In some embodiments, primary power system 106 includes many floor power distribution units 112. As another example, a primary power system may have one UPS that can supply power to many floor power distribution units.

Data center 50 includes switchgear controller device 120. Switchgear controller device 120 is separate and external from switchgear apparatus 105. In some embodiments, switchgear controller device 120 is communicatively coupled to one or more external components, systems, etc. For example, in the illustrated embodiment, switchgear controller device 120 is communicatively coupled to switchgear apparatus 105 and can send switchgear operation commands to switchgear apparatus 105 to command the switchgear apparatus 105 to switch between two or more power feeds. Switchgear controller device 120 may, in some embodiments, communicate one or more switchgear operation commands to switchgear apparatus 105 to command the switchgear apparatus 105 switch from the utility power feed supplied by transformer 102 to one or more back-up power feeds supplied by one or more generators 104.

Switchgear controller device 120 includes a communication interface 121. In some embodiments, the device 120 is communicatively coupled to various components, systems, etc. in data center 50, including one or more portions of power system 100. The interface 121 may receive data associated with various portions of the power system 100, including data associated with various power distribution components located in the portions. Data associated with a power distribution component may indicate one or more particular present configurations of the component, including a present operating mode of the component. Where a given component includes multiple internal components, the data associated with the given component may include data indicating one or more particular configurations of one or more of the internal components. In the illustrated embodiment, device 120 is communicatively coupled to switchgear apparatus 105, transformer 102, generator 104, one or more of the UPSs 110 and floor PDUs, etc. The device may receive data from the various communicatively coupled components via interface 121. In some embodiments, signals can be communicated from the device 120 to one or more various components, systems, etc. of data center 50 via the interface 121. For example, switchgear operation commands generated at the switchgear controller device 120 may be transmitted to switchgear apparatus 105 via interface 121. In another example, generator operation commands generated at the switchgear controller device may be transmitted to one or more generators 104 via the interface 121. In some embodiments, switchgear controller device 120 is communicatively coupled to one or more components of one or more rack systems 51, including one or more racks 52, computer systems 54, rack-level power distribution units 56, some combination thereof, or the like. In some embodiments, one or more signals can be communicated between the switchgear controller device 120 and one or more of the components of rack system 51, including signals received at the switchgear controller device 120 from one or more components of rack system 51, signals transmitted from the switchgear controller device 120 to one or more components of rack system 51, etc.

Switchgear controller device 120 includes a control module 124. In some embodiments, switchgear operation commands to the switchgear apparatus 105 are generated by the control module 124. In some embodiments, control module 124 generates switchgear operation commands based at least in part upon a determination that a particular switchgear operation command to the switchgear apparatus to perform a particular switching operation is to be generated. Such a determination may be made at the control module 124 based at least in part upon analysis of various data received from various portions of the power distribution system 100. In some embodiments, control module 124 generates switchgear operation commands based at least in part upon commands received from a user via one or more interfaces 122, 126 of the switchgear controller device 120.

Switchgear controller device includes a user interface 122. In some embodiments, the user interface can include a human machine interface (HMI). In some embodiments, interface 122 displays various information associated with the switchgear controller device 120 in a visual interface screen. Such information can include information indicating various present and historical alarms associated with one or more various components in the data center 50. Such information can include graphical representations of various portions of the power system 100. In some embodiments, the graphical representations can indicate one or more present configurations of various portions of the power system 100 including present configurations of various components in the various portions. In some embodiments, one or more of the graphical representations may be interactive, where a user can interact with the graphical representation to input a user command to control module 124 to generate one or more commands associated with the component represented by the graphical representation. In some embodiments, the interface 122 can enable access to various aspects of the switchgear controller device, including functional timers associated with the control module 124 and alarm logs 128, based at least in part upon particular user interaction with particular interactive icons displayed via the interface 122.

Switchgear controller device 120 includes an operation mode selection interface 126. In some embodiments, operation mode selection interface can receive one or more user-initiated commands, also referred to herein as "user commands", to selectively establish, also referred to herein as "selecting", "setting", etc. the operating mode of the switchgear controller device 120 between one or more various particular operating modes. The operating mode selection may be used by control module 124 to determine what inputs are utilized in determining to generate particular operation commands, including switchgear operation commands, generator operation commands, some combination thereof, or the like. In some embodiments, the various operation modes include an "automatic mode" and a "manual mode", where the switchgear controller device 120, in "automatic mode", generates commands to external components or systems based on determinations made by the control module 124 independently of user commands. In "manual mode," the switchgear controller device 120 may generate commands to external components or systems based exclusively on user commands received from the user via one or more interfaces, including user interaction with various graphical representations displayed in a visual interface via interface 122. Determinations made by the control module 124 independently of user commands in automatic mode can include determinations made by the control module 124 based at least in part upon analysis of data received from various portions of power system 100, various stored operation protocols, some combination thereof, or the like. Data analysis may include identifying occurrences of one or more various power system events based at least in part upon analysis of at least some received data and generating a particular operation command based at least in part upon the identified power system event.

In some embodiments, the switchgear controller device 120 interfaces with one or more switchgear apparatuses 105, generators 104, etc. to initiate an open transition switch from Utility to Generator power on any out-of-tolerance or source loss events. For the duration of the open transition, power to the racks 52 may be supported by the UPSs 110 system via power supplied from one or more sets of batteries internal to the UPSs 110. The device 120 may also initiate restoration to utility power once the utility power feed is detected and deemed to have acceptable characteristics. Acceptable characteristics of a power feed may include characteristics, including voltage, current, etc. of the power feed that have values that do not at least meet one or more predetermined threshold values. In some embodiments, where multiple threshold values for a given characteristic comprise a tolerance band, or "range", of values, acceptable characteristics may include power feed characteristics that are within the tolerance band of values.

In some embodiments, the switchgear controller device receives redundant power support from multiple independent power feeds. For example, as shown in the illustrated embodiment, switchgear controller device 120 can receive separate power feeds from separate independent power sources. As shown, each power feed may be supplied to the device 120 via separate independent UPSs 130, 140. In some embodiments, switchgear controller device 120 includes one or more internal power supply units, UPSs, internal power sources, etc. As a result, the switchgear controller device can receive power independently of the power distribution system 100 and has multiple levels of power redundancy support. For example, the illustrated device 120 receives 2N support redundancy via the separate power feeds supplied via separate UPSs 130, 140. In addition, where one or more internal power sources can provide power in the event of a loss of power feeds from all external power sources, the illustrated device can be understood to receive at least 3N support redundancy.

Figure 2:
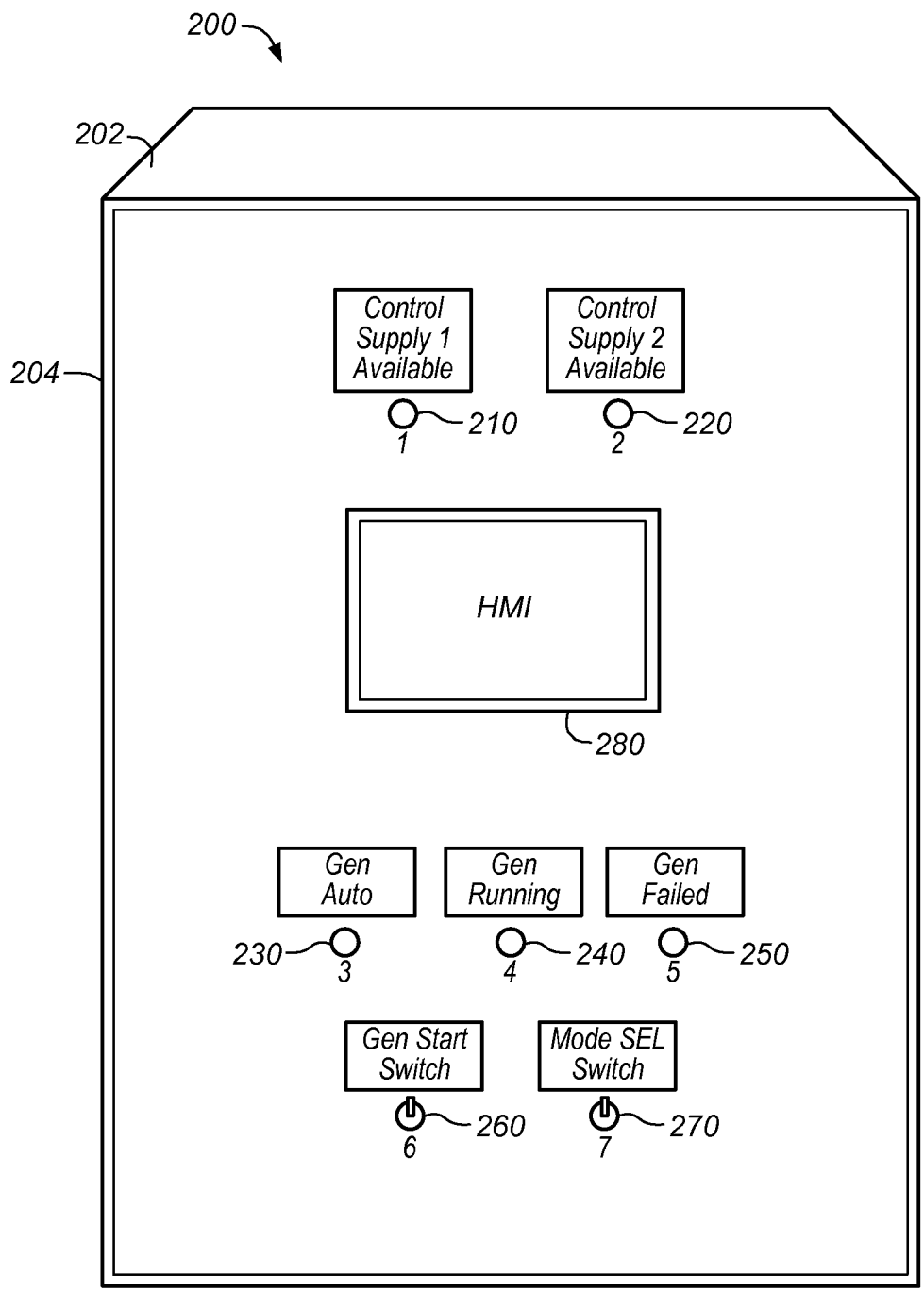
FIG. 2 illustrates a front panel of a switchgear controller device, including various interfaces and indicators of the device, according to some embodiments.

FIG. 2 illustrates a front panel of a switchgear controller device, including various interfaces and indicators of the device, according to some embodiments.

Switchgear controller device 200 includes an enclosure 202 and a front panel 204. In some embodiments, the switchgear controller device 200 includes a wall-mounted enclosure 202 with a front panel 204 that is available for user interaction. The switchgear controller device 200 may be mounted in a data center electrical room, in proximity to the switchgear apparatus, to enable optimal user access.

In some embodiments, front panel 204 of the enclosure 202 of switchgear controller device 200 includes various interfaces and indicators. Indicators 210 and 220 can indicate availability of respective separate power feeds supplying power to the switchgear controller device. The separate power feed may be paralleled to achieve a common potential. For example, with reference to device 120 illustrated in FIG. 1, indicator 210 may indicate that a power feed from UPS 130 is being received at the switchgear controller device, and indicator 220 may indicate that a separate power feed from UPS 140 is being received at the switchgear controller device, where the separate power feeds have a common 24-volt, 20 A potential. In some embodiments, the indicator may include a visual indicator, including an LED lamp, etc., that activates based at least in part upon a determination by at least a portion of the device 200 that a power feed is being received that meets at least one or more particular characteristics. For example, where a power feed is received from a particular power source and the power feed has characteristics that meet, exceed, fail, etc. one or more predetermined tolerance thresholds, including voltage, current, etc. then a corresponding indicator lamp may not activate.

In some embodiments, front panel 204 includes an operating mode selection interface 270 that can be manipulated, based at least in part upon an user-initiated interaction with the interface, to select an operating mode of the switchgear controller device 200. For example, the interface 270 may include a 3-position switch, where each position of the switch is associated with a particular operating mode, including manual, automatic, and offline, reset, etc. and a user may turn the switch to align with one of the switch positions to select a particular operating mode.

With a Manual operating mode selected, the user may have complete control of the generation of operation commands by the switchgear controller device 200. Generation of operation commands to start a generator, open and close various circuit breakers included in a switchgear apparatus, etc. may be based exclusively upon receiving particular user commands from a user to generate such commands. Such particular commands may be received via user interaction with one or more portions of one or more interfaces, including interfaces 260, 270, and 280. One or more portions of the switchgear controller device, including one or more modules of a control module that determine generation of particular operation commands based at least in part upon analysis of data received from various external components, systems, etc. when the switchgear controller device is operating in an automatic mode, are inhibited in the manual mode.

With an offline, reset mode, etc. selected, a control module auto-fail condition generated in the event of an operational failure may be cleared. Various portions of the control module may be inhibited.

With an Automatic operating mode selected, the control module may have complete control of operation command generation. A user may have complete visibility of the condition of the power distribution system via various interfaces and indicators and may be precluded from providing user commands via one or more interfaces to control the generation of various operation commands by the switchgear controller device 200.

In some embodiments, front panel 204 includes a generator control interface 260 which can be manipulated by a user to command the switchgear controller device 200 to generate one or more various operation commands to the generator. For example, the interface 260 can be manipulated by the user to command the device 200 to generate a generator startup command to the generator without commanding the device 200 to generate a switchgear operation command to a switchgear apparatus.

In some embodiments, front panel 204 includes indicators 230, 240, 250 that indicate one or more various present configurations of a generator to which the device 200 is communicatively coupled. The indicators may include one or more LEDs and each indicator may be associated with indicating a separate present configuration of the generator. For example, indicator 230 may activate to indicate that the generator is in an automatic operating mode. Indicator 240 may activate to indicate the generator is running Indicator 250 may activate to indicate that the generator has failed. The indicators may activate based at least in part upon one or more signals received at the switchgear controller device 200 from a generator engine management system associated with one or more generators.

In some embodiments, the switchgear controller device 200 can receive one or more signals from a generator emergency stop control, including an emergency stop pushbutton. Based at least in part upon receiving such a signal, a control module in the device 200 may generate an indication to a user, via a graphical representation displayed on HMI 280, that a back-up power circuit breaker is open and may further remove interactive graphical representations that can be interacted with by the user to input a user command to the device 200 to generate a generator start-up operation command.

In some embodiments, the switchgear controller device 200 includes a "watchdog" circuit that can indicate a present health indication of the device 200 to a separate and external building management system (BMS). Such a circuit may be output signal from the switchgear control module that is "on" healthy for fail safe operation.

In some embodiments, the switchgear controller device 200 can provide various status signals to interface with indicators mounted on a main switchboard of a data center. Such signals can include a signal that the control module of device 200 is in automatic failure mode, a signal that a generator is carrying a load, a signal that the power distribution system is in automatic mode, and a signal that one or more power busses is dead.

In some embodiments, front panel 204 includes an HMI display 280. The HMI, in some embodiments, enables a "gateway" for a user to the power distribution system. From the HMI, a user may be able to determine the status of the power distribution system with regards to alarms, faults and available power feeds. As a result, a user may be enabled to quickly understand the condition of the equipment and act accordingly if required.

In some embodiments, a control module of the switchgear controller device 200 communicates directly with the HMI 280. The HMI may display various graphical representations depicting various portions of the power distribution system based upon data analysis at the control module of data received associated with the various portions. The graphical representations may include graphical representations of present configurations of various components in various portions of the power distribution system. For example, the HMI 280 may display graphical representations of utility and generator breaker status (open, closed, tripped, etc.). The HMI 280 may display one or more present countdown timers associated with various logical operations performed by the control module to determine whether to generate various particular operation commands.

In some embodiments, HMI 280 can display alarm logs. The logs may be active and live on a separate screen page, accessible only via user provision of a particular password. In some embodiments, HMI 280 can enable access to the various functional timers associated with control module operations. Such access may be enabled based at least in part upon user provision of another particular password. In some embodiments, enabling such access may also include enabling a user to manually override various functional timers via interaction with various icons and graphical representations on the HMI 280 display.

In some embodiments, the HMI 280 includes an Ethernet serial port and the necessary hardware and software to allow for communication with an upstream communication network topology.

Figure 3:
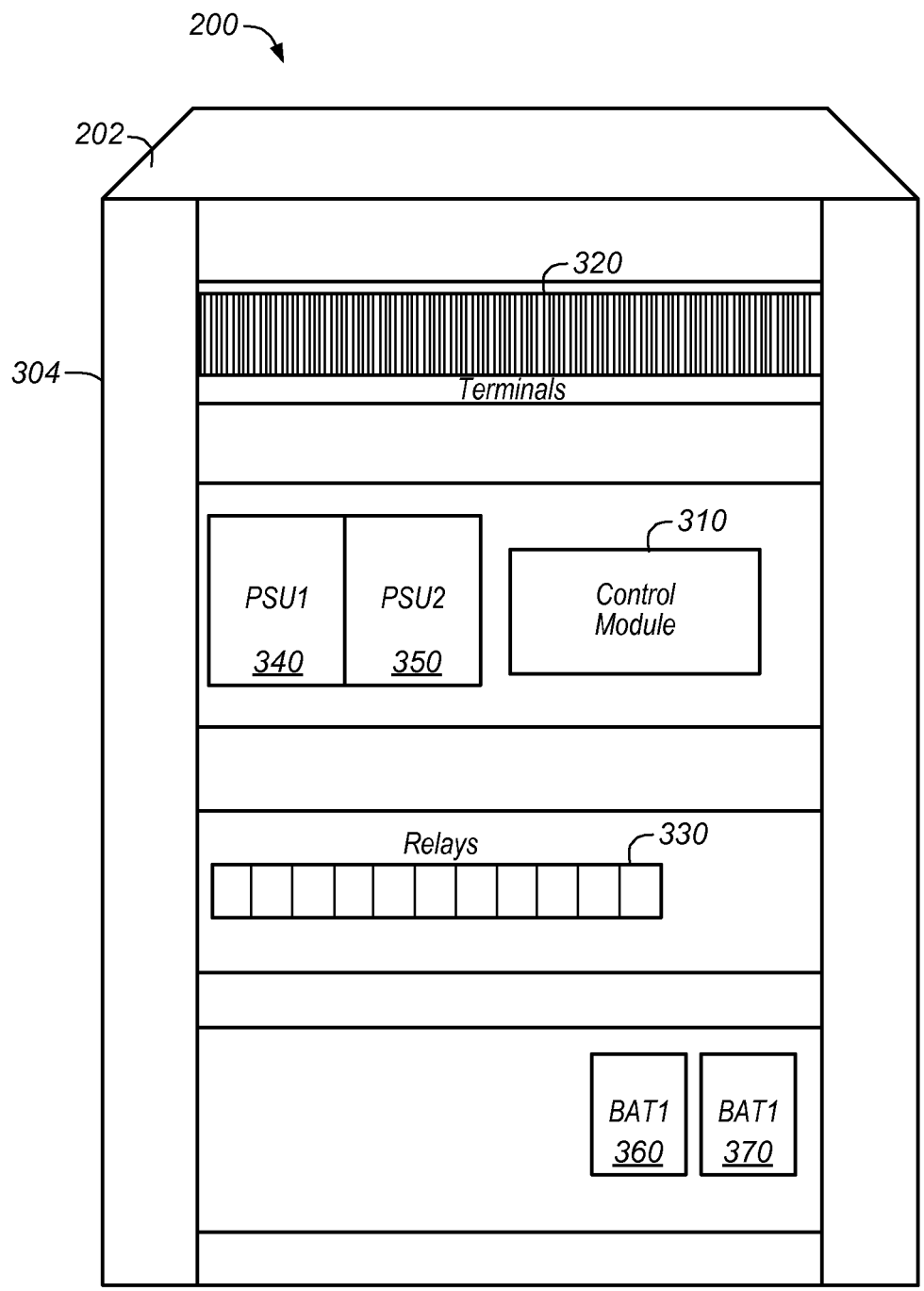
FIG. 3 illustrates a rear panel of a switchgear controller device, including various components of the device, according to some embodiments.

FIG. 3 illustrates a rear panel of a switchgear controller device 200, including various components of the device, according to some embodiments. In some embodiments, switchgear controller device 200 includes an enclosure 202 with a rear panel 304. The rear panel may enable maintenance access to various components of the switchgear controller device 200.

In some embodiments, the switchgear controller device 200 includes one or more control modules 310. One or more of the control modules 310 may include a switchgear control module device that communicates with an HMI to generate graphical representations on the HMI and generates operation commands to various external devices based at least in part upon various received inputs. External devices, as referred to herein, can include one or more various external components, systems, etc.

In some embodiments, the switchgear controller device 200 includes power supply units 340, 350. Each power supply unit may be coupled to receive a separate power feed from a separate power source. For example, each power supply unit (PSU) 340, 350 may be electrically coupled to a power transmission line that supplies a separate power feed distributed from a separate UPS, where each separate UPS may be supplied with power from a separate power source. Each PSU 340, 350 may convert the received power feed to a power feed having particular characteristics. For example, each PSU may convert the respective power feed received at that particular PSU to supply 24-volt power to one or more various components of the switchgear controller device 200. In some embodiments, the PSUs 340, 350 can convert the power from each of the separate power feeds to be where the separate power feeds to supply power feeds with a common 24-volt, 20-amp potential. In some embodiments, the PSU 340, 350 each supply power to a common UPS that is internal to the switchgear controller device 200.

In some embodiments, switchgear controller device 200 includes one or more sets of batteries 360, 370. The sets of batteries 360, 370 may be included in one or more UPSs that are internal to the switchgear controller device 200. In some embodiments, the batteries 360, 370 can provide a back-up source of power to at least the control module 310 of the switchgear controller device in the event that power is lost from external power feeds to each of the PSUs 340, 350. As a result, the batteries 360, 370 can provide an additional source of power support redundancy to the control module 310, in addition to the 2N power support redundancy provided by the PSUs 340, 350. In some embodiments, the batteries 360, 370 are included in one or more UPSs that receive power from one or more of the PSUs 340, 350 and supply power to at least the control module 310. In such embodiments, the UPS may supply power from the batteries 360, 370 to at least the control module 310 in the event that power feeds from each of the coupled PSUs are lost.

In some embodiments, switchgear controller device 200 includes one or more terminals 320. The various terminals may be communicatively coupled, via one or more communication pathways, cables, etc., to various external components. Each terminal may be coupled to a particular external component to send or receive a particular signal associated with the external component.

In some embodiments, switchgear controller device 200 includes one or more relays 330. A relay may be coupled to one or more external components and may provide, to control module 310, a signal indicating one or more various configurations associated with one or more various devices. For example, a relay may indicate whether a utility circuit breaker is closed, whether the switchgear controller device 200 itself is set to automatic operating mode, etc.

Figure 4:
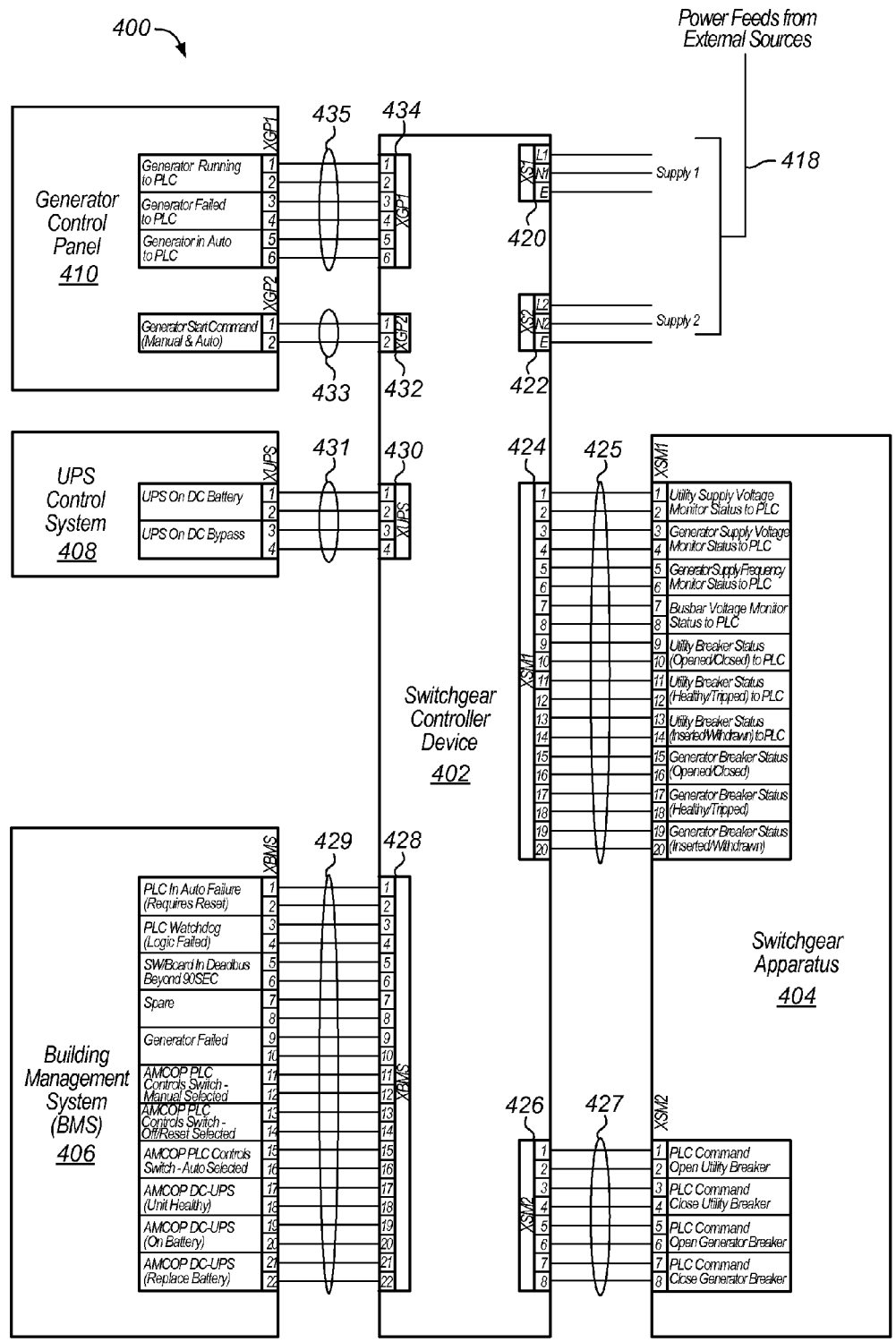
FIG. 4 illustrates a power distribution system including a switchgear controller device communicatively coupled to various external components and illustrates signals that can be communicated between the switchgear controller device and the various components, according to some embodiments.

FIG. 4 illustrates a power distribution system including a switchgear controller device communicatively coupled to various external components and illustrates signals that can be communicated between the switchgear controller device and the various components, according to some embodiments. Power distribution system 400 includes two or more separate power feeds 418, a switchgear apparatus 404, a switchgear controller device 402, a generator control panel 410 associated with one or more generators, a UPS control system 408 associated with one or more UPSs, and a Building Management System (BMS).

In some embodiments, a switchgear controller device is communicatively coupled with various external components and systems. The communicative couplings with the various external components and systems can enable the switchgear controller device to communicate with one or more of the various external components and systems. Some components may be communicatively coupled to communicate in a single direction between components (i.e., one-way communication), and some components may be communicatively coupled to communicate in a multiple directions between components (i.e., two-way communication). For example, in the illustrated embodiment, switchgear controller device 402 is communicatively coupled to multiple external components and systems 404, 406, 408, 410 and data can be communicated between the various components and systems in one or more directions. In another example, as discussed further below, device 402 may be communicatively coupled to components 404, 408, and 410 and may receive input signals from said components, where the input signals may include data indicating one or more present configurations of one or more components in the power distribution system 400, portions of the system 400, etc. In addition, switchgear controller device 402 may be communicatively coupled to components 404, 406, and 410 and may generate output signals to said components, where the output signals may include one or more operation commands generated at the switchgear controller device 402, one or more indication signals generated at the switchgear controller device, 402.

In some embodiments, communication between various communicatively coupled components and systems in system 400 are one-way. For example, in the illustrated embodiment, switchgear controller device 402 is communicatively coupled to the UPS control system 408, where communications between the UPS control system 408 and device 402 are restricted to input signals 431 received at the device 402 from the UPS control system 408 and the device 402 is restricted from generating output signals to the UPS control system 408. In addition, in the illustrated embodiment, switchgear controller device 402 is communicatively coupled to the BMS 406, where communications between the BMS 406 and device 402 are restricted to output signals 429 generated at the device 402 to the BMS 406 and the device 402 is restricted from receiving input signals from the BMS 406.

Switchgear controller device 402 is communicatively coupled to switchgear apparatus 404 via respective sets of communication terminals 424, 426. Each set of terminals may include one or more terminals that are coupled to particular corresponding connectors on switchgear apparatus 404. Each terminal may be configured for communication of a particular signal between switchgear controller device 402 and switchgear apparatus. For example, as shown in the illustrated embodiment, each of terminals 424 are coupled to particular connectors of switchgear apparatus 404, so that each terminal 424 can receive a particular input signal 425 that is associated with a particular present configuration of one or more components associated with the switchgear apparatus, including a particular one of multiple potential configurations of a utility breaker in the switchgear apparatus (open or closed). As shown, each of terminals 424 are restricted to receive particular input signals from switchgear apparatus 404, where each particular input signal indicates the presence or absence of a particular present configuration of one or more components associated with switchgear apparatus 404.

In addition, as shown in the illustrated embodiment, each of terminals 426 are coupled to particular connectors of switchgear apparatus 404, so that each terminal 426 can transmit a particular output signal 427 that is associated with a particular operation command generated at the switchgear controller device 402. For example, as shown, one of terminals 426 can transmit a generated signal to switchgear apparatus 404 that indicates a particular operation command to close the utility breaker, open the utility breaker, open the generator breaker, close the generator breaker, etc. Each terminal may be exclusively associated with a particular signal associated with a particular command.

Switchgear controller device 402 is communicatively coupled to generator control panel 410 via respective sets of communication terminals 432, 434. Each set of terminals may include one or more terminals that are coupled to particular corresponding connectors on generator control panel 410. Each terminal may be configured for communication of a particular signal between switchgear controller device 402 and generator control panel 410. For example, as shown in the illustrated embodiment, each of terminals 434 are coupled to particular connectors of generator control panel 410, so that each terminal 434 can receive a particular input signal 435 that is associated with a particular present configuration of one or more components associated with the generator control panel 410. As shown, each of terminals 434 are restricted to receive particular input signals from generator control panel 410, where each particular input signal indicates the presence or absence of a particular present configuration of one or more components associated with generator control panel 410, including one or more generators. For example, as shown one or more terminals is restricted to receive a signal indicating presence or absence of a present configuration of a generator associated with control panel 410 that includes the generator having failed.

In addition, as shown in the illustrated embodiment, each of terminals 432 are coupled to particular connectors of generator control panel 410, so that each terminal 432 can transmit a particular output signal 433 that is associated with a particular operation command generated at the switchgear controller device 402. For example, as shown, one of terminals 432 can transmit a generated signal to control panel 410 that indicates a particular operation command to startup a generator associated with control panel 410. Each terminal may be exclusively associated with a particular signal associated with a particular command.

Switchgear controller device 402 is communicatively coupled to UPS control system 408 via one or more sets of communication terminals 430. Each set of terminals may include one or more terminals that are coupled to particular corresponding connectors on UPS control system 408. Each terminal may be configured for communication of a particular signal between switchgear controller device 402 and UPS control system 408. For example, as shown in the illustrated embodiment, each of terminals 430 are coupled to particular connectors of UPS control system 408, so that each terminal 430 can receive a particular input signal 431 that is associated with a particular present configuration of one or more components associated with the UPS control system 408, which may include one or more present configurations of one or more components of one or more UPSs associated with control system 408. As shown, each of terminals 430 are restricted to receive particular input signals from UPS control system 408, where each particular input signal indicates the presence or absence of a particular present configuration of one or more components associated with UPS control system 408. For example, as shown, one or more terminals 430 is restricted to receive a signal indicating presence or absence of a present configuration of a UPS associated with UPS control system 408 that includes the UPS is operating in a bypass operating mode, DC battery operating mode, etc.

Switchgear controller device 402 is communicatively coupled to BMS 406 via one or more sets of communication terminals 428. Each set of terminals may include one or more terminals that are coupled to particular corresponding connectors on BMS 406. Each terminal may be configured for communication of a particular signal between switchgear controller device 402 and BMS 406. For example, as shown in the illustrated embodiment, each of terminals 428 are coupled to particular connectors of BMS 406, so that each terminal 428 can transmit a particular output signal 429 that is associated with an indication of a present configuration of one or more components, systems, etc. in system 400. As shown, each of terminals 428 are restricted to transmit particular output signals 429 to BMS 406, where each particular output signal indicates the presence or absence of a particular present configuration of one or more components or systems. Such a present configuration may include a present operating mode, condition, physical configuration, state, health, etc. associated with one or more particular components or systems. For example, as shown, one or more terminals 428 is restricted to transmit a signal indicating presence or absence of a particular present configuration of a component or system associated with system 400, including a signal indicating that the switchgear control module is in auto-failure mode, a signal indicating that a generator has failed, etc.

Switchgear controller device 402 is communicatively coupled to separate power feeds 420, 422 from one or more separate power sources 418, which can include one or more external sources of power that are external to the power distribution system 400. In some embodiments, the one or more power sources include separate and independent power sources. For example, each of power feeds 420, 422 may be received from separate UPS units. In some embodiments, the separate UPSs may receive power from a common power source as one or more power feeds routed by the switchgear apparatus 404, including one or more utility power sources, generator power sources, etc. In some embodiments, the separate power feeds 420, 422 are received into one or more separate power supply units that supply a converted feed. For example, each of power feeds 420, 422 may include a 230-volt AC power feed and may be received into one or more separate power supply units that convert the feed to a 24-volt DC power feed. In some embodiments one or more of the power feeds 420, 422 may have one or more various characteristics; for example, a 230-volt power feed, a 110-volt power feed, etc.

Figure 5:
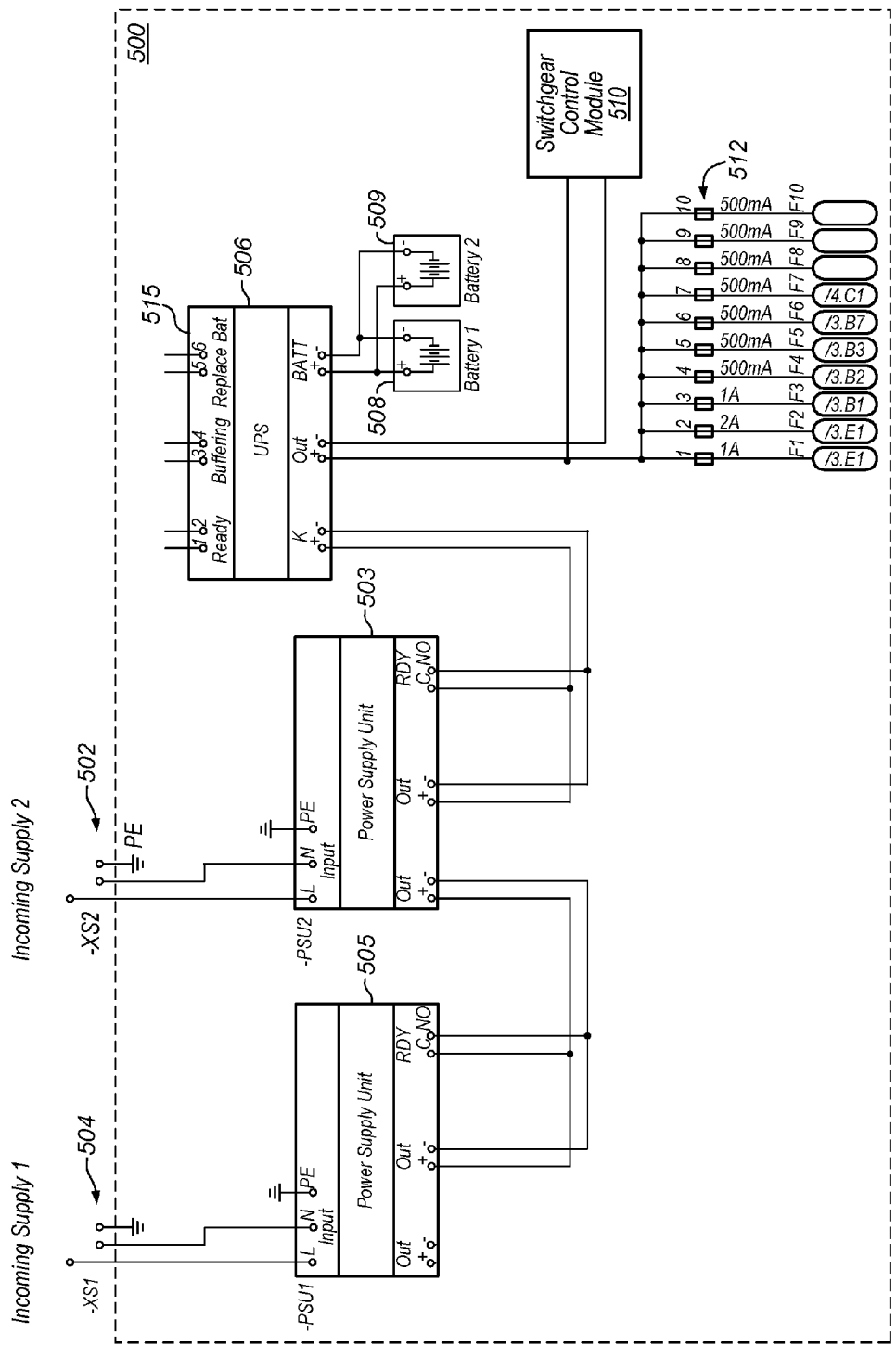
FIG. 5 illustrates power connections between various components included in a switchgear controller device, according to some embodiments.

FIG. 5 illustrates power connections between various components included in a switchgear controller device, according to some embodiments. Switchgear controller device 500 includes power supply units 503, 505, internal UPS 506, batteries 508, 509, switchgear control module 510, and relays 512.

Each power supply unit 503, 505 receives a corresponding power feed 502, 504 to provide power to one or more components of the switchgear controller device 500. In some embodiments, each power feed 502, 504 is a separate power feed from a separate power source. For example, each power feed may be supplied from a separate UPS. Such UPSs may be located in a common facility with switchgear controller device 500 and may receive source power from a common power source as one or more power distribution systems to which the switchgear controller device is communicatively coupled.

In some embodiments, each power supply unit 503 converts received power to supply a power feed having one or more particular characteristics. For example, in the illustrated embodiment, where each power feed 502, 504 includes a 230-volt AC, 20-amp, 50-hertz power feed, each power supply unit 503, 505 can convert the respective received power to a 24-volt DC, 20-amp power feed. In some embodiments, each power supply unit 503, 505 can supply a respective power feed with common characteristics as the power feed supplied by the other power supply unit. In some embodiments, one or more of the power supply units 503, 505 can be configured to accept power feeds with various characteristics, including various voltages. For example, one or more of power supply units 503, 505 may be "multivoltage" power supply units that can accept power feeds 502, 504 having a voltage of 230 volts, 110 volts, etc. In another example, one or more of power supply units 503, 505 may be "multifrequency" power supply units that can accept power feeds with various frequencies, including 50-hertz, 60-hertz, etc.

In some embodiments, each power supply unit supplies output power from the respective power supply unit to a UPS that is internal to the switchgear controller device. For example, as shown, each power supply unit 503, 505 supplies power that is ultimately supplied to an internal UPS 506. As illustrated regarding power supply unit 505, in some embodiments a power output from one power supply unit 505 is supplied to another power supply unit 503 that supplies output power to the UPS 506.

In some embodiments, the internal UPS 506 supplies power to one or more electrical loads in the switchgear controller device. Such supplied power may be referred to as operating power with regard to such electrical loads. For example, as illustrated, the UPS 506 can supply power to switchgear control module 510 and the various relays 512 included in switchgear controller device 500. The power supplied from the UPS may be initially supplied from various power sources, thereby enabling the UPS to provide power support redundancy to the supported electrical loads. For example, as UPS 506 receives power supplied from two separate power feeds 502, 504, the UPS can support at least a 2N level of power support redundancy for the control module 510 and relays 512, as the UPS can continue to supply operating power to both components from one of the power feeds 502, 504 if one of the power supply units 503, 505 becomes unable to receive a corresponding power feed 502, 504.

In addition, in some embodiments, the UPS 506 supplies power received from an internal power source of a switchgear controller device 500 for at least a certain period of time in the event of a loss of power from all external power sources. For example, as shown in the illustrated embodiment, UPS 506 includes sets of batteries 508, 509. The UPS can supply power from some or all of the batteries 508, 509 to components 510, 512 as operating power to same in the event that both power feeds 502, 504 are lost, become unavailable, etc. As a result, UPS 506 can support at least a 3N level of power support redundancy, where each of at least two separate power feeds and at least one set of internal batteries provide at least three potential power sources from which to supply operating power. As the batteries may have a limited amount of power supply capacity, the UPS may be limited to supplying power from batteries 508, 509 for a limited period of time. However, in some embodiments, the switchgear controller device 500 may be configured to include batteries having a total amount of power that is sufficient to supply operating power to one or more of components 510, 512 for at least a predetermined minimum amount of operating time, such as at least seven hours of continuous operation. Such a predetermined minimum amount of operating time may correspond to a predetermined maximum amount of time at which both power feeds 502, 504 are expected to be simultaneously unavailable.

In some embodiments, the internal UPS includes one or more communication terminals 515 that can transmit signals indicating one or more present configurations of the internal UPS. In the illustrated embodiment, for example, UPS 506 includes terminals 515 that can separately transmit signals corresponding to indications of a present configuration where UPS is "ready", a present configuration where the UPS is "buffering", a present configuration where batteries 508, 509 presently require replacement, etc. The signals can be transmitted to the control module 510, which may generate an indication corresponding to the present configuration for display on a user interface of the device 500. The signals can, in some embodiments, be transmitted to an external component, system, etc., including a building management system (BMS).

Figure 6:
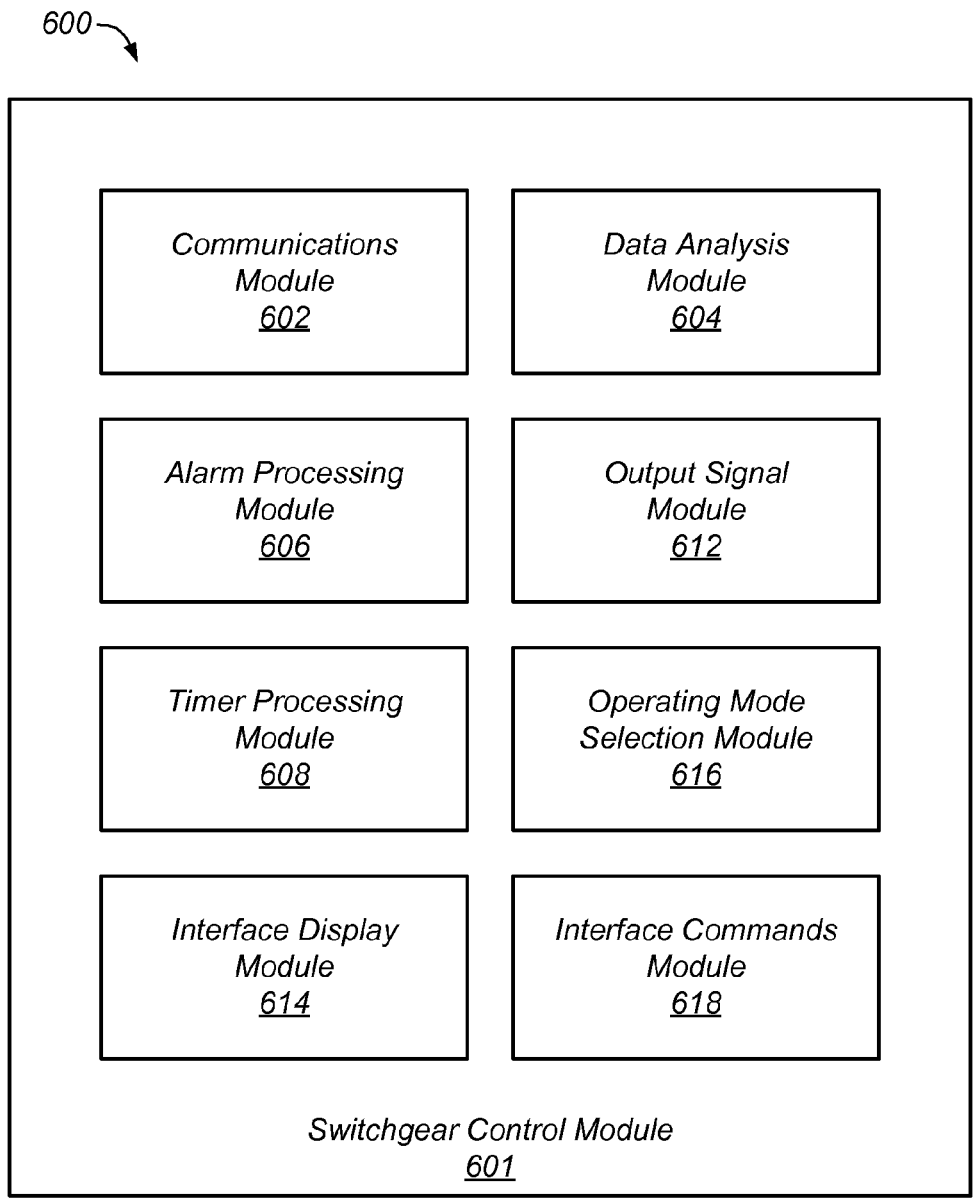
FIG. 6 illustrates a switchgear control module, including various modules included therein, according to some embodiments.

FIG. 6 illustrates a switchgear control module, including various modules included therein, according to some embodiments. In some embodiments, one or more modules of the switchgear control module are implemented by one or more computer systems in the switchgear controller device, including one or more computer systems referred to hereinafter as a switchgear control module device.

Switchgear controller device 600 may include one or more switchgear control modules 601. A switchgear control module can include various modules that can execute various functions associated with the switchgear controller device. For example, switchgear control module 601 may include one or more modules that receive data from various external sources, including data included in input signals received from various external sources via one or more terminals of the switchgear controller device 600, commands received from a user via interaction with an interface of the switchgear controller device etc. Switchgear control module 601 may include one or more modules that analyze received data, identify various present configurations of various portions of a power distribution system, set one or more operating modes of the switchgear controller device, monitor alarms and functional timers, communicate data to one or more interfaces to present information to a user, generate various signals to transmit to external components or systems, etc.

In some embodiments, switchgear control module 601 includes a communications module 602. Communications module may receive and process signals received at the switchgear controller device 600 from one or more external components or systems, transmit signals to one or more external components or systems, etc. For example, Communications module 602 may receive and process input signals received from various components of a power distribution system via terminals of device 600. In another example, one or more signals, including indications, operation commands, etc. generated by one or more various modules of control module 601 may be transmitted by communications module to one or more external components or systems via one or more interfaces, transceivers, etc.

In some embodiments, switchgear control module 601 includes a data analysis module 604. The data analysis module 604, in some embodiments, processes data received at control module 601 via one or more received input signals. The data processing can include analyzing the data to identify one or more various present configurations of one or more portions of a power distribution system, including one or more various configurations of one or more components included in the portions. In some embodiments, module 604 compares the data to data associated with a particular known configuration, where the known configuration corresponds to one or more particular signals to be generated by control module 601. Module 604 may analyze data received from various sources and identify a particular configuration of a portion of the power distribution system, which may include identifying occurrence of a particular event in the portion. The module 604 may identify corresponding output signals, including indications, operation commands, etc. associated with the identified event and may command one or more modules of control module 601 to generate the corresponding output signals.

In some embodiments, the identified present configurations of one or more portions of a power distribution system are utilized by one or more modules of switchgear control module to generate one or more user interfaces. Such generation may include generating one or more graphical representations of the various portions and may provide a user with information indicating such present configurations. For example, data analysis module 604 may determine, based at least in part upon information received from a UPS located in a downstream portion of the power distribution system, where the downstream portion is located downstream of a switchgear apparatus in the system, that the UPS is operating in one or more particular operating modes. Such a determination may be utilized to generate one or more output signals, generate one or more graphical representations to display to a user via an interface, etc.

In some embodiments, switchgear control module 601 includes an alarm processing module 606. In some embodiments, data analysis module 604 may determine, based at least in part upon analysis of received data, that a present configuration of one or more components in the power distribution system at least meets one or more predetermined threshold conditions associated with a predetermined alarm condition. Module 606 may generate an alarm indication associated with the predetermined alarm condition. The alarm indication may be stored locally to the switchgear controller device 600, displayed via a user interface, including an HMI, utilized to generate one or more output signals to one or more external systems or components, etc.

In some embodiments, switchgear control module 601 includes a timer processing module 608. In some embodiments, a determination of a particular present configuration of one or more components or systems, a determination that a particular output signal is to be generated, etc. may include utilizing a timer associated with the determination. For example, where data analysis at module 604 indicates a particular present configuration of one or more portions of a power distribution system that is determined to associate with a predetermined configuration, the determination may further require one or more predetermined functional timers to elapse at least a certain period of time before one or more determinations are made regarding the power distribution system, before one or more output signals are generated, etc. Module 608 may establish and run one or more timers in association with one or more determinations made at data analysis module 604 regarding a present configuration of one or more components, systems, etc. Module 608 may store the predetermined timer values against which the established timers are compared, such that a period of elapsed time by a given timer that exceeds the stored timer value associated with a particular configuration determined by module 604 may lead to one or more further determinations, output signal generations, etc. In some embodiments, the predetermined timer values can be accessed, changed, added, deleted, etc.

In some embodiments, switchgear controller module 601 includes an output signal module 612. The output signal module can, based at least in part upon particular determinations made regarding present configurations of various portions of a power distribution system, generate one or more output signals to be transmitted to one or more external components, systems, etc. For example, where data analysis module 604 determines, based at least in part upon data received from a UPS downstream of the switchgear that the UPS has entered a battery operation mode due to detected instability in the utility power feed and further determines, based at least in part upon timer processing module 608, that the UPS has been in battery operating mode more than a predetermined period of elapsed time in association with the detected instability, output signal module 612 may generate a switchgear operation command to transmit to the switchgear apparatus to command the switchgear apparatus to switch from the utility power feed to a back-up power feed. In another example, where data analysis module 604 determines that an alarm condition is present with regard to at least one component, such as a generator having failed, output signal module 612 may generate one or more output signals that include an alarm indication to transmit to a BMS, indicating to the BMS that the generator has failed.

In some embodiments, switchgear control module 601 includes an operating mode selection module 616. Module 616 can establish an operating mode of the switchgear controller device 600. The operating mode can determine which inputs are used by one or more portions of switchgear control module 601 to generate output signals, enable user interactions via one or more interfaces, etc. The operating mode selection module 616 may establish the operating mode based at least in part upon a user-initiated interaction with an operating mode selection interface to input a user command selecting a particular operating mode.

In some embodiments, an operation mode includes an "automatic" operating mode, where at least some output signals, including operation commands to one or more switchgear apparatuses, generators, etc. are generated independently of user-initiated commands to the switchgear controller device 600. For example, one or more modules of switchgear controller device 601 may restrict a user interface, including an HMI, from displaying one or more certain interactive graphical representations, where the interactive nature is associated with enabling a user to command device 600 to control at least an external component or system. In addition, one or more one or more modules of switchgear controller device 601 may restrict user-initiated commands from providing a basis for generating one or more output signals. In some embodiments, output signals, including operation commands, are generated based exclusively upon determinations made regarding present configurations of various portions of the power distribution system when device 600 is in an automatic operating mod. For example, where device 600 is in an automatic operating mode, and data analysis module 604 analyzes received data to determine that a utility power feed to the switchgear apparatus in a power distribution system is lost, unavailable, unusable, etc., output signal module 612 may generate a switchgear operation command to the switchgear apparatus to switch to a back-up power feed, and may further generate a generator operation command to the generator to start up, based exclusively upon the determination made at module 604 and independent of any user-initiated command received at device 600 from a user via one or more user interfaces.

In some embodiments, an operation mode includes a "manual" operating mode, where at least some output signals, including operation commands to one or more switchgear apparatuses, generators, etc. are generated based upon user-initiated commands received at device 600 via one or more interfaces and independently of determinations made at one or more portions of switchgear control module 601. For example, one or more modules of switchgear controller device 601 may enable a user interface, including an HMI, to display one or more certain interactive graphical representations of various portions of a power distribution system, where the interactive nature of the representations is associated with enabling a user to command device 600 to control at least an external component or system based upon user interaction with the displayed representations. In addition, one or more one or more modules of switchgear controller device 601 may restrict at least some determinations made at data analysis module 604 from providing a basis for generating one or more output signals. In some embodiments, output signals, including operation commands, are generated based exclusively upon user-initiated commands received based upon user interaction with displayed graphical representations on a visual interface, user interactions with one or more other interfaces, etc. For example, where device 600 is in a manual operating mode, and interface commands module 618 receives a user command via user interaction with a particular interactive graphical representation of a closed utility circuit breaker of a switchgear apparatus, output signal module 612 may generate a switchgear operation command to the switchgear apparatus to open the utility circuit breaker, and interface display module 614 may generate an updated graphical representation that shows the utility circuit breaker as open and further includes an interactive graphical representation of an open back-up power circuit breaker, which the user can interact with to command device 600 to command the switchgear apparatus to close.

In some embodiments, switchgear control module 601 includes an interface display module 614. The module 614 can generate data that can be communicated to an interface, including an HMI, to display one or more visual interface elements on the interface. In some embodiments, the module 614 can generate data that can be communicated to an HMI to display one or more graphical representations of various portions of a power distribution system, including various components included in the various portions. In some embodiments, the module 614 generates data to display particular graphical representations that show one or more particular present configurations of various components in various portions of a power distribution system. For example, module 614 can generate data used by an HMI to display a graphical representation of a power distribution system that shows whether a generator power source for a back-up power feed is activated, which power feed is being used to supply operating power to the electrical load, which electrical pathways and components are routing the operating power, the positions of various breakers, switches, etc. in various portions of the power distribution system, etc. In some embodiments, module 614 can generate data used to display interactive graphical representations, where a user interaction with an interactive representation is interpreted by one or more portions of switchgear control module, including module 618, as a particular user-initiated command.

In some embodiments, the identity of a user-initiated command may be associated with the interactive graphical representation of the present configuration of the component, system, etc. For example, where module 614 generates data used to display an interactive graphical representation of a utility circuit breaker in a closed configuration, the potential commands associated with interaction with the representation may be restricted to a command to open the utility circuit breaker.

In some embodiments, the switchgear control module 601 includes an interface commands module 618. The module 618 can receive and process commands received via user-initiated interaction with one or more user interfaces. For example, where a user interacts with an operating mode selection interface to select a particular operating mode of device 600, module 618 may receive a particular signal associated with the user's particular interaction from the interface and process the signal to determine the particular operating mode being commanded. In another example, where a user interacts with a graphical representation of a component of a power distribution system, where potential commands associated with such interaction are restricted to one or more particular commands, module 618 may receive and process a signal from a user interface associated with the user's interaction with the representation to determine that a user command to perform the one or more particular commands is received.

Figure 7A:
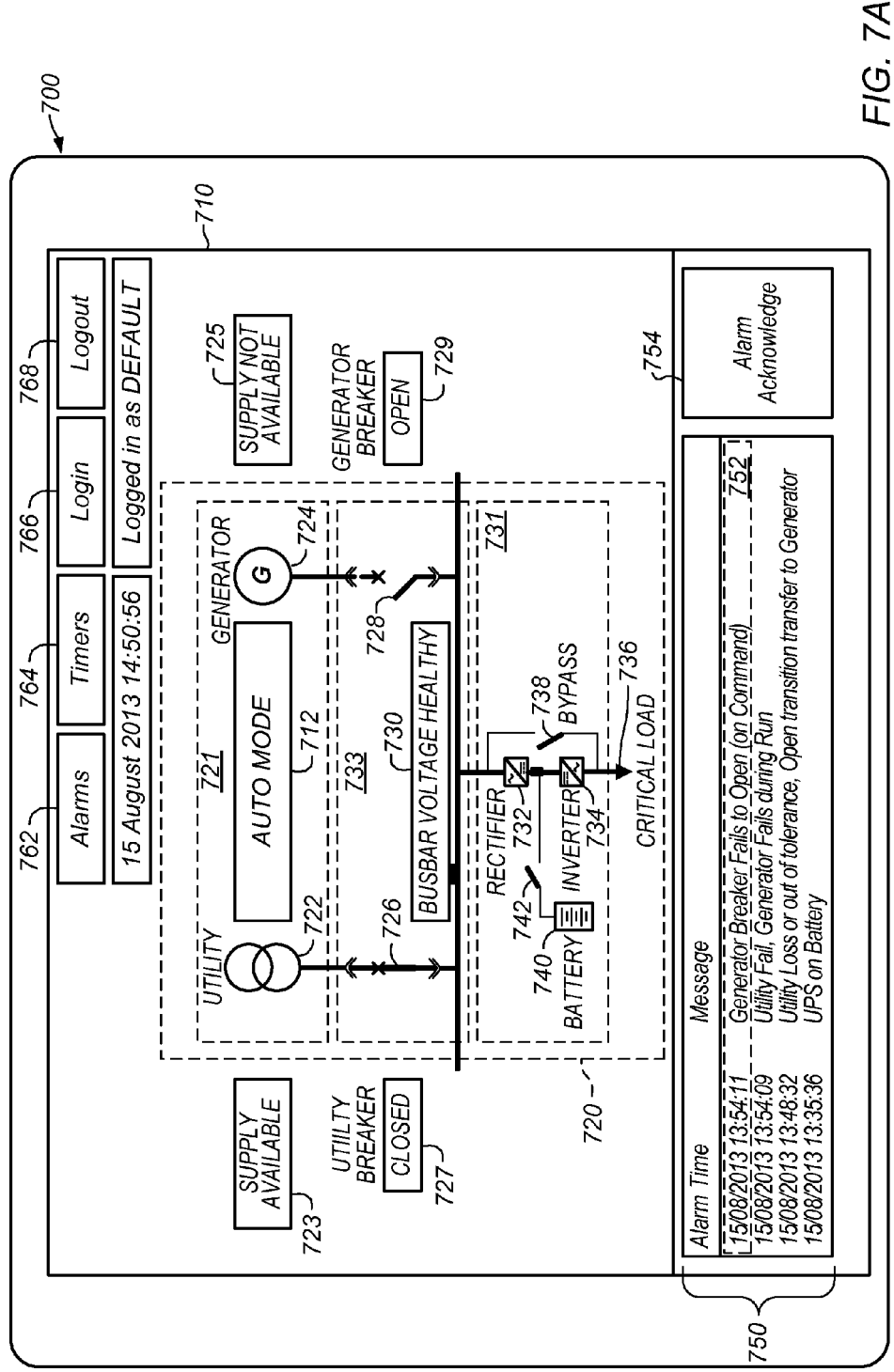
FIG. 7A illustrates a human machine interface of the switchgear controller device, where the interface presents at least a graphical representation of various portions of the power distribution system, according to some embodiments.

FIG. 7A illustrates a human machine interface of the switchgear controller device, where the interface presents at least a graphical representation of various portions of the power distribution system, according to some embodiments. HMI 700 includes a visual display screen 710 upon which various visual interactive and non-interactive elements may be displayed, including various interactive icons 754, 762-768 associated with various user commands, visual displays 750 of alarm events associated with the power distribution system, and a graphical representation of at least various portions of a power distribution system 720, where the graphical representation 720 includes graphical representations of various portions of the system, including representations of various components in upstream portions of the system located upstream of the switchgear apparatus, components in downstream portions of the system located downstream of the switchgear apparatus, components of the switchgear apparatus, etc. The graphical representations associated with one or more components can indicate one or more present configurations of the component. Some of the graphical representations may be interactive, where a user can interact with the graphical interactions to input one or more particular commands to command the switchgear controller device to perform one or more various particular functions.

Display screen 710 may, in some embodiments, include a touchscreen, where a user can touch the screen at a location corresponding with the location of a graphical representation, icon, etc. on the screen to interact with the representation. In some embodiments, the user can interact with graphical representations, icons, etc. via one or more interfaces, including a keyboard interface, one or more physical buttons, a mouse, some combination thereof, or the like.

In some embodiments, an HMI 700 can display a graphical representation of a power distribution system 720 that includes a switchgear apparatus to which the switchgear controller device is communicatively coupled. The system 720 can include graphical representations of various portions of the power distribution system. Such portions may include portions that are upstream of the switchgear apparatus in the power distribution system, also referred to as "upstream portions," portions that are downstream of the switchgear apparatus and upstream of the electrical load, also referred to as the "critical load", in the power distribution system, also referred to as "downstream portions," and one or more various components included in the switchgear apparatus. For example, in the illustrated embodiment, the graphical representation 720 of a power distribution system that includes a switchgear apparatus to which the switchgear controller device is communicatively coupled includes a representation 733 of various components included in the switchgear apparatus, including switchboard bus 730 and power feed breakers 726, 728; a representation 721 of various components included in an upstream portion 721, including a utility transformer 722 and a generator 724; a representation 731 of a downstream portion that includes various components 740, 742, 732, 734, 738 associated with a UPS in the power distribution system, and a representation 736 of the critical load.

In some embodiments, one or more graphical representations associated with a power distribution system include a graphical representation of a present configuration of one or more components of the power distribution system. Such a representation can include a representation of whether the component is active, whether an active power feed is routed through the component, one or more operating modes of the component, a physical positioning of the component, etc. Representations indicating whether power is flowing through one or more pathways may be indicated through color coding. For example, a pathway, component, etc. through which power operating power is being supplied may be colored red, while other pathways, components, etc. may be colored blue to represent the lack of active power flow, etc. associated with the component. In the illustrated embodiment, where power is being supplied from the utility transformer through the utility breaker, the pathway from the transformer 722 to the bus bar 730 may be colored red to illustrated the operating power is flowing through that pathway, while the pathway from the generator 724, across the breaker 728, and to the bus bar may be colored blue to represent the lack of active power flow through that pathway.

In some embodiments, one or more graphical representations indicate a present configuration, condition, etc. of one or more components in a power distribution system. For example, in the illustrated embodiment, where various components of a UPS are illustrated in the representation 731 of the downstream portion, the graphical representation can show that the UPS is operating in a particular operating mode based at least in part upon the representations of the various components associated with the UPS. As shown, where the bypass 738 and battery switch 742 are both represented to be in an open configuration, and a pathway from the bus bar 730 to the critical load 736 may be colored a distinct color to illustrate the flow of operating power from the bus bar 730 to the critical load 736 through the rectifier 732 and inverter 734, the representation 731 may show that the UPS is in a normal operating mode, where power supplied from the switchgear apparatus is being routed to the critical load through the UPS. In another example, where the bypass switch 738 is illustrated in a closed position, the pathway from the bus bar 730 to the critical load 736 through the bypass is colored one color, such as red, and the pathway through at least the rectifier and inverter is colored another color, such as blue, the representation 731 may show that the UPS is in a bypass operating mode, where power supplied from the switchgear apparatus is supplied to the critical load via a bypass that bypasses the UPS. In another example, where the pathway from the bus bar 730 to at least the rectifier 732 is colored one color, such as blue, and the switch 742 is illustrated in a closed position and the pathway from the batter 740 to the critical load is colored another color, such as red, the representation 731 may show that the UPS is in a battery operating mode, where operating power is supplied to the critical load via one or more batteries associated with the UPS.

In some embodiments, the graphical representation 720 may be updated based upon changing configurations of various portions of the represented power distribution system. For example, where breakers 726, 728 change position, and generator 724 activates, representation 720 may update to show that power is being routed through the switchgear apparatus from the back-up power feed from the generator 724.

In some embodiments, the display 710 can include additional indicators of configurations of one or more components, systems, etc. associated with the represented power distribution system. For example, indicators 727, 729 can provide an indication, in addition to corresponding representations 726, 728, of the present configuration of the respective breakers. In some embodiments, indicators 727, 729 may be interactive, such that a user can interact with one or more of indicators 727, 729 to command the switchgear controller device to command the switchgear apparatus to switch a position of at least one of the breakers. For example, in the illustrated, embodiment, where indicator 727 is interactive, a user may interact with the indicator 727, such as via touching the display 710 at the location of the indicator 727, to command the switchgear controller device to open the utility circuit breaker. In some embodiments, indicators 723, 725 can provide indication of the availability of power from one or more various power sources. As shown indicator 723 indicates that utility power is available from transformer 722, and indicator 727 indicates that back-up power is not available from generator 724. In some embodiments, where the generator representation 724 is interactive, a user may interact with the representation 724 to command the switchgear controller device to generate operation commands to the generator, including start-up and shutdown commands.

In some embodiments, display 710 includes an icon 712 that indicates the present operating mode of the switchgear controller device. In the illustrated embodiment, icon 712 illustrates that the switchgear controller device is operating in an automatic operating mode. In some embodiments, when the switchgear controller device is operating in an automatic operating mode the icons and graphical representations included in and associated with representation 720 may be non-interactive, as user commands may not be considered as part of generation of output signals by the switchgear controller device control module. In some embodiments, where the switchgear controller device is operating in a manual operating mode, at least some of the icons and representations may be interactive, where a user can input commands to the switchgear controller device by interacting with one or more of the icons and representations. For example, where the switchgear controller device is operating in a manual operating mode, the display 710 may include a semi-interactive representation 720, where graphical representations of certain portions of the power distribution system are interactive and graphical representations of other certain portions remain non-interactive.

In the illustrated embodiment, graphical representations included in representation 731 of the downstream portion may remain non-interactive regardless of operating mode, while representations 721, 733 associated with the upstream portion and switchgear apparatus may be at least partially interactive. For example, one or more of icons 727, 729, 725, representations 726, 728, 724, etc. may be interactive so that a user can interact, including touching, the icons or representations to issue a command to perform a particular function associated with the represented component or system. In some embodiments, where a representation or icon is interactive, the commands that are associated with interactions with the representation or icon may be restricted to one or more particular commands, such that user interaction with the representation or icon is interpreted as receipt of the particular one or more commands. For example, user interaction with an interactive icon 727 may be interpreted as a command to change the configuration of the represented breaker 726 to either open or close, based on the present configuration of the breaker.

In some embodiments, the command associated with the representation or icon may be updated based upon changing present configurations of the power distribution system. For example, where a user interacts with an interactive icon 727 to open breaker 726, icon 727 may be updated to be associated with a command to close the breaker, and icon 729 may be updated to be associated with a command to close breaker 728. Upon user interaction with icon 729, a command may be generated to close breaker 728, and icon 727 may be updated to be associated with no commands (i.e., become non-interactive) to preclude both breakers from being closed simultaneously.

In some embodiments, display 710 includes a graphical representation of a list 750 of alarm events associated with one or more of the switchgear controller device, power distribution system, etc. The list 750 may be scrolling, so that only the most recent alarm events are shown. As shown in the illustrated embodiment, each entry on the list may include a date and time and description of the alarm event.

In some embodiments, the scrolling list 750 highlights a new entry associated with a most recent alarm event. For example, where entry 752 is the most recent alarm event, the entry may be highlighted upon being added to list 750. Such highlighting may include a flashing indication associated with some or all of the entry, a distinct color coding of the entry, etc. In some embodiments, display 710 may include an interactive acknowledgement icon 754, where a user can interact with the icon 754 to acknowledge the occurrence of the most recent alarm event. Upon receiving such acknowledgement via confirming interaction with the icon 754, the HMI 700 may remove the highlighting of the most recent alarm event entry 752.

In some embodiments, display 762 includes interactive icons 766, 768 associated with user access to various functions associated with the switchgear controller device. In some embodiments, upon receiving user interaction indications regarding a login icon 766, the HMI may display a prompt for an access password. Various passwords, which may be associated with various levels of access, may be accepted. Upon receiving a particular valid password associated with a particular access level, the HMI may grant user access to interact with various icons, commensurate with the access level associated with the particular valid password.

In some embodiments, display 710 includes an interactive icon 762 associated with alarm event logs. While display 710 may show a list 750 of a selection of most recent alarm events, the HMI may display a more comprehensive log of alarm events beyond the selection of most recent events. Upon receiving an indication of a user interaction with icon 762, the HMI may present a graphical display of a log of historical alarm events. Such access to the log may be predicated upon the access level associated with a password provided to the HMI subsequent to interaction with icon 766. In some embodiments, where a first access level is required to access the logs via icon 762, HMI may deny access to the alarm logs, upon user interaction with icon 762, where the user fails to provide a password corresponding to the first access level.

In some embodiments, display 710 includes an interactive icon 762 associated with enabling user access to alarm event logs. While display 710 may show a list 750 of a selection of most recent alarm events, the HMI may display a more comprehensive log of alarm events beyond the selection of most recent events. Upon receiving an indication of a user interaction with icon 762, the HMI may display a log of historical alarm events. Such access to the log may be predicated upon the access level associated with a password provided to the HMI subsequent to interaction with icon 766. In some embodiments, where a first access level is required to access the logs via icon 762, HMI may deny access to the alarm logs, upon user interaction with icon 762, where the user fails to provide a password corresponding to the first access level.

In some embodiments, display 710 includes an interactive icon 762 associated with enabling user access to functional timers associated with the switchgear controller device. Upon receiving an indication of a user interaction with icon 764, the HMI may display the various information associated with functional timers associated with various determinations that may be made by one or more portions of the switchgear controller device. The information associated with the functional timers may include one or more predetermined periods of elapsed time associated with a given timer. The HMI may allow user interaction with the various displayed functional timers, including changing predetermined periods of elapsed time, adding functional timers, removing functional timers, etc. . . . . Such access to the log may be predicated upon the access level associated with a password provided to the HMI subsequent to interaction with icon 766. Such an access level may be different from an access level sufficient to access alarm logs via interaction with icon 762. In some embodiments, where a first access level is required to access alarm logs via icon 762, and where a second access level is required to access the functional timer data via icon 764, HMI may deny access to the functional timers, upon user interaction with icon 764, where the user fails to provide a password corresponding to the second access level. In some embodiments, the first access level is insufficient to meet the second access level, and the second access level is sufficient to meet the first access level.

Figure 7B:
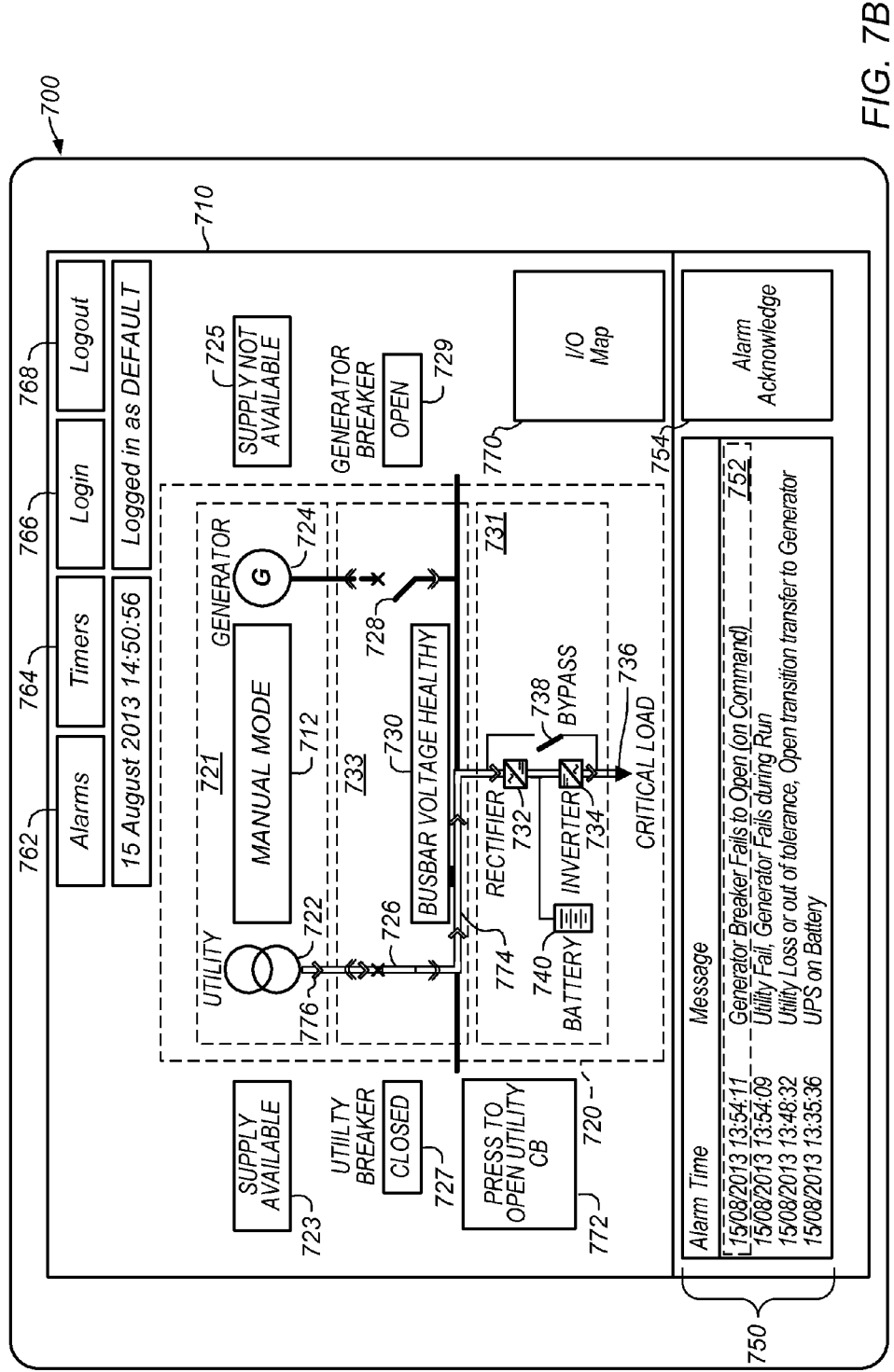
FIG. 7B illustrates a human machine interface of the switchgear controller device, where the interface presents at least a graphical representation of various portions of the power distribution system, according to some embodiments.

FIG. 7B illustrates a human machine interface of the switchgear controller device, where the interface presents at least a graphical representation of various portions of the power distribution system, according to some embodiments.

In some embodiments, display 710 indicates a present operating mode of the switchgear controller device. As shown in the illustrated embodiment, icon 712 indicates that the switchgear controller device is configured in a manual operating mode. In a manual operating mode, various graphical icons and graphical representations of portions of a power distribution system 720, which may be non-interactive in an automatic operating mode, may be interactive. Such interactive icons and representations may be associated with one or more user commands, where a user-initiated interaction with an icon, representation, etc. may be interpreted as receipt of the user command associated with the respective icon, representation, etc.

In some embodiments, one or more icons are displayed based at least in part upon the present operating mode of the switchgear controller device. As shown in the illustrated embodiment, icon 772, which may be associated with a user command to generate a switchgear operation command for a particular circuit breaker represented as representation 726, may be displayed on display 710 based at least in part upon the switchgear controller being in a manual operating mode. Where the switchgear controller device is in an automatic operating mode, icon 772 may not be displayed on display 710.

In some embodiments, an icon, representation, etc. may be updated based at least in part upon receipt at the switchgear controller device of a user command via user-initiated interaction with one or more graphical representations and icons displayed in display 710. Updating an icon, representation, etc. can include modifying an indicated present configuration of one or more components, systems, etc., modifying which user commands are associated with the icon, representation, etc., modifying one or more elements of information provided by the icon, representation, etc., some combination thereof, or the like. For example, where icon 772 initially is associated with a user command to open breaker 726, and a user interacts with icon 772, such that a switchgear operation command to open breaker 726 is opened, icon 772 may be modified to disassociate icon 772 from a user command to open the breaker 726, to associate the icon 772 with a user command to close the breaker 726, to indicate that interaction with the icon 772 will "close" the utility breaker, some combination thereof, or the like.

In some embodiments, a representation of a power distribution system on display 710 includes a representation of a pathway of operating power to the critical load through one or more portions of the power distribution system. Such a representation can include a highlighting of the pathway portions of the power distribution system through which operating power is being routed to the critical load. The representation can include animation elements, including scrolling elements that move along the pathway from a power source representation to the representation of the critical load.

In the illustrated embodiment, for example, where power is being routed from a utility power source, through the switchgear apparatus, and to the critical load, a representation 774 of the pathway portion through which the operating power is routed may be highlighted and include animated elements 776, which can include arrow elements, to highlight the pathway through which the operating power is being routed to the critical load. The highlighting can include highlighting the operating power pathway representation 774 a separate color from the representations of the pathways through which operating power is not being routed. For example, representation 774 may be a red color, and other representations of other pathways may be a blue color. Where a pathway of operating power changes, the representation 774 may change to represent the changed pathway. For example, where bypass switch 738 is closed, pathway representation 774 may pass through bypass 738 and not through rectifier 732 and inverter 734.

The animated elements 776 may scroll along the pathway representation 774 from the power source to the critical load. As shown, multiple elements 776 are moving along the pathway representation 774 from the power source of the operating power to the critical load 736.

In some embodiments, display 710 may include an interactive input and output map icon 770, where a user can interact with the icon 770 to access a map of inputs and outputs associated with the switchgear controller device. In some embodiments, such access to the map is free from password protection.

FIG. 7C illustrates a human machine interface of the switchgear controller device, where the interface presents at least a graphical representation of a map of inputs and outputs associated with the switchgear controller device. Such a map may be displayed to a user via a display 710 of HMI 700. The map may be displayed based at least in part upon a user interaction with an interactive icon 770 as illustrated and discussed above with reference to FIG. 7B.

In some embodiments, an input and output map associated with a switchgear controller device includes a map of inputs to the switchgear controller device and a map of outputs from the switchgear controller device, where each map includes individual entries for each of the respective inputs or outputs that include an indication of the present state of the respective input or output. As shown in the illustrated embodiment, map 780 includes a map 781 of inputs to the switchgear controller device and a map 791 of outputs from the switchgear controller device. Inputs include one or more particular signal inputs to the switchgear controller device, and outputs include one or more particular signal outputs from the switchgear controller device. Inputs and outputs may be communicated via at least one or more communication interfaces of the switchgear controller device, including one or more terminals, relays, etc. associated with specific inputs and outputs.

As shown, each map 781, 791 includes multiple entries for each of the inputs and outputs of the switchgear controller device. Each entry includes an indicator 782, 792 of the respective entry, a descriptor 783, 793 of the respective input or output associated with the entry, and a status indicator 784, 794 associated with the respective input or output, where the status indicator indicates a present state associated with the respective input or output. Various status indications may be associated with particular inputs or outputs. As shown, an indicator 784 for various inputs can indicate that a particular input signal indicates that a component associated with the input signal is "healthy", "stopped", operating in a "manual" operating mode, "not in manual" mode, "not in off/reset" mode, "not in auto" mode, "open", "tripped", "withdrawn", "open," etc. As also shown, an indicator 794 for various outputs can indicate that a particular output signal is "on", "off", etc. In some embodiments, map 780 includes a return icon 797 with which a user can interact to cause the HMI to switch back to display 710, illustrated in FIG. 7A-B.

Figure 8:
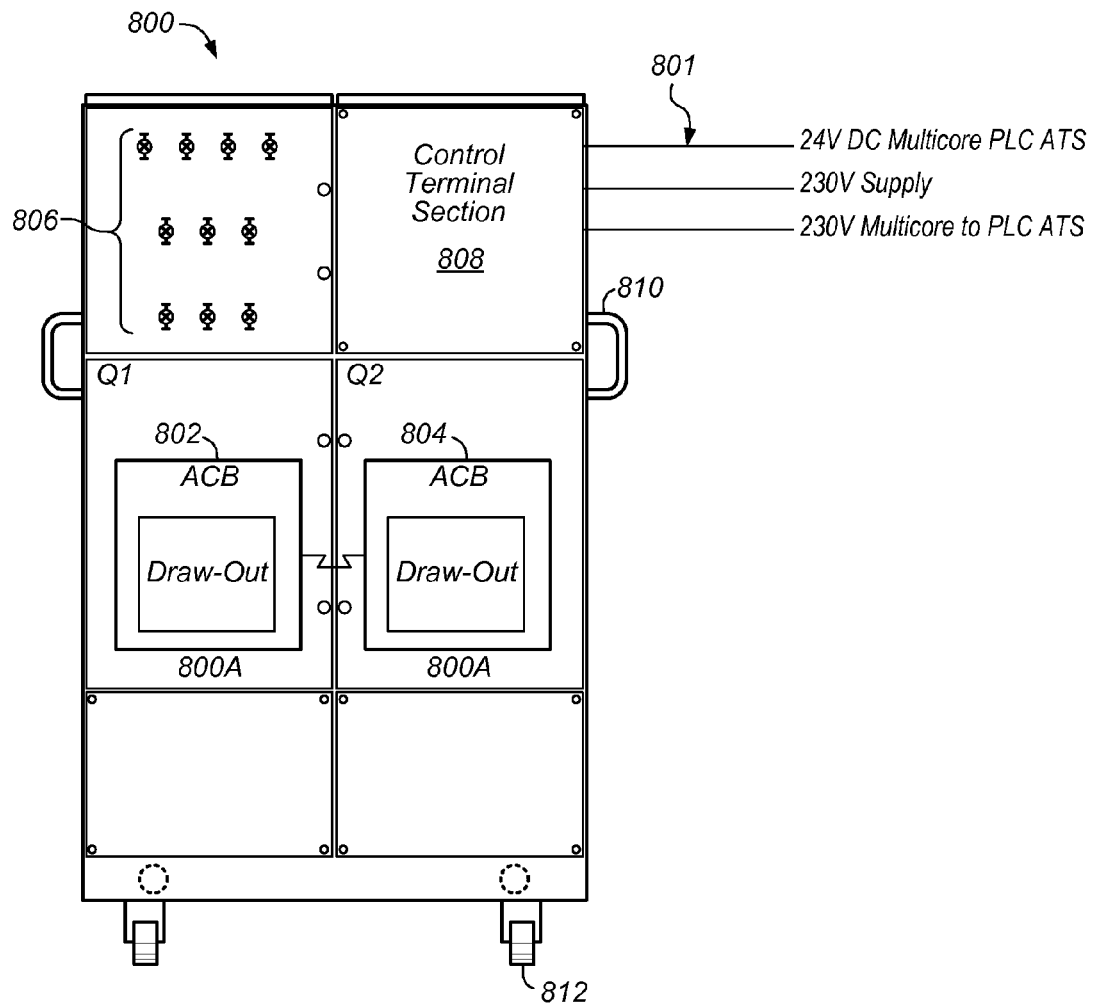
FIG. 8 illustrates a switchgear controller device training apparatus, according to some embodiments.

FIG. 8 illustrates a switchgear controller device training apparatus, according to some embodiments.

In some embodiments, a training apparatus can couple with a switchgear controller device to allow functional testing of the switchgear controller device generation of operation commands and to allow testing of user interactions with the switchgear controller device, also referred to as operator training.

Training apparatus 800 includes circuit breakers 802, 804. The breakers may be mechanically interlocked and fitted with Opening/Closing coils and auxiliary and position contacts. Training apparatus 800 includes selector switches 806 which can provide input status signals to the coupled switchgear controller device. Training apparatus 800 includes a control terminal 808 that is communicatively coupled with the switchgear controller device via pathways 801. The input status signals can simulate various configurations associated with a power distribution system. For example, the status signals can be manipulated, based at least in part upon manipulation of various switches 806, to simulate various voltage source and equipment failure scenarios in a power distribution system. The input status signals can be analyzed by a control module in the switchgear controller device as a simulation of data received from various portions of a power distribution system, and the control module can generate operation commands based at least in part upon the signals. In some embodiments, including where the switchgear controller device is operating in a manual operating mode, the input status signals are utilized by the control module to generate graphical representations of portions of a power system that are displayed to a user via an HMI, and the user may command the controller switchgear device to generate various operation commands by interacting with various graphical representations displayed via the HMI. As a result, the input status signals can be used to various voltage source and equipment failure scenarios in a power distribution system to test a user's ability to recognize and respond consistently to such scenarios with appropriate instructions to the switchgear controller device via interaction with various interfaces thereon.

Training apparatus 800 may include handles 810 and lockable wheels 812 that can be manipulated by a user to move the apparatus 800 to various locations. In some embodiments, the apparatus 800 is mobile and can be moved in proximity to various switchgear controller devices to test operation command generation by the switchgear controller device in various operation modes.

Figure 9:
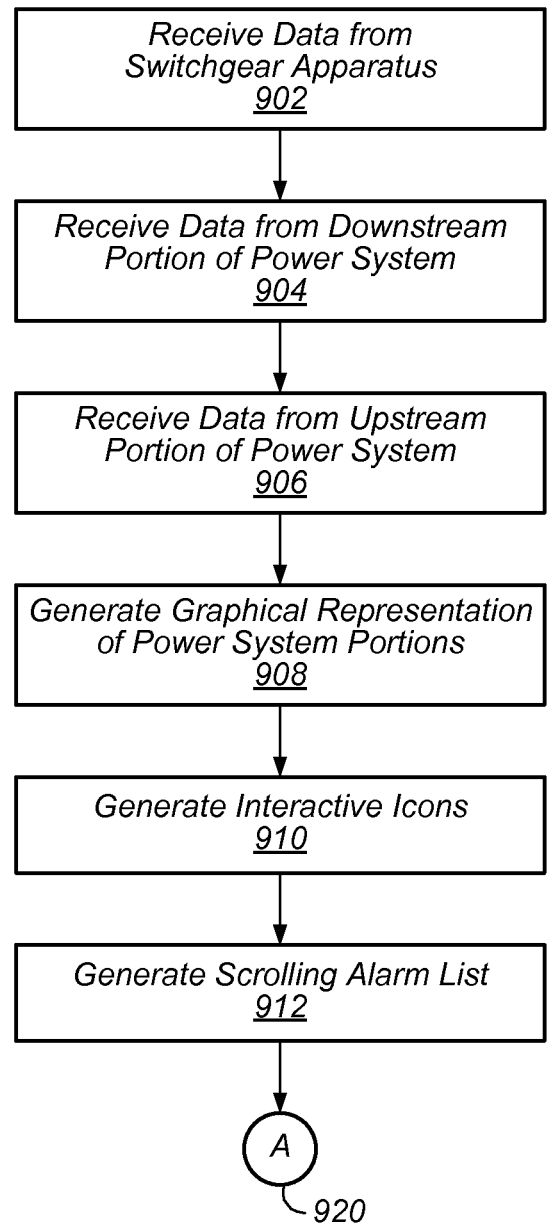
FIG. 9 illustrates generating various elements of a visual user interface of a switchgear controller device based at least in part upon data received from various portions of a power distribution system, according to some embodiments.

FIG. 9 illustrates generating various elements of a visual user interface of a switchgear controller device based at least in part upon data received from various portions of a power distribution system, according to some embodiments. In some embodiments, the presenting data is implemented at least in part by one or more portions of a switchgear controller device.

At 902, data is received from a switchgear apparatus in a power distribution system. In some embodiments, where a power distribution system includes multiple switchgear apparatuses, data may be received from one or more of the multiple switchgear apparatuses. The received data may indicate a present configuration of at least the switchgear apparatus. For example, the data may indicate one or more characteristics of a switchboard bus of the switchgear apparatus, one or more circuit breakers of the switchgear apparatus, one or more characteristics of various power feeds that may be available to be routed through respective circuit breakers, etc.

At 902, data is received from a portion of the power distribution system that is downstream of the switchgear apparatus in the power distribution system. Such a portion is referred to as a "downstream portion" of the power distribution system. Data received from the downstream portion may include information indicating one or more present configurations of one or more components, pathways, etc. included in the downstream portion. For example, data received from the downstream portion may include information indicating that various components of a UPS in the downstream portion are in particular present configurations such that the UPS is presently in one of various particular operating modes, including normal operating mode, bypass operating mode, battery operating mode, etc.

At 906, data is received from a portion of a power distribution system that is upstream of the switchgear apparatus in the power distribution system. Such a portion is referred to as an "upstream portion" of the power distribution system. Data received from the upstream portion may include information indicating one or more present configurations of one or more components, pathways, etc. included in the upstream portion. For example, data received from the upstream portion may include information indicating that a power feed is being stepped down and routed to the switchgear apparatus through a transformer. Such data may include information indicating a present operating mode of a generator power source for a power feed that may be routed to the switchgear apparatus.

At 908, one or more graphical representations of various portions of the power distribution system are generated. The graphical representations may be generated based at least in part upon at least some data received from various portions of the power distribution system, including the upstream portion, downstream portion, and switchgear apparatus. One or more of the graphical representations may include a graphical representation of a present configuration of one or more components, pathways, systems, etc. included in one or more portions of the power distribution system. For example, a generated graphical representation may include a representation of a switchgear apparatus that that includes a closed utility power feed circuit breaker and an open back-up power feed circuit breaker, a representation of a generator upstream of the switchgear apparatus that indicates that the generator is presently off-line, an a representation of a UPS downstream of the switchgear apparatus that indicates that the UPS is present in a normal operating mode.

In some embodiments, some of the graphical representations of various portions of the power distribution system include one or more interactive graphical representations, icons, etc. which, when interacted with by a user via a user interface, including an HMI, provide one or more particular input signals associated with the interactive graphical representation, icon, etc. Whether a graphical representation is interactive may be established based at least in part upon the present operating mode of the switchgear controller device, the particular portion of the power distribution system that the graphical representation represents, etc. For example, a graphical representation of a power distribution system may include interactive graphical representations of upstream components included in the upstream portion, interactive graphical representations of components included in the switchgear apparatus, and non-interactive graphical representations of components included in the downstream portion.

At 910, one or more various interactive icons associated with various aspects of the power distribution system. The interactive icons can include icons associated with receiving user-initiated commands regarding various power distribution system components, icons associated with accessing various information and characteristics associated with the switchgear controller device, etc. For example, an interactive icon can include an icon associated with a closed utility power feed circuit breaker and associated with a particular switchgear operation command to open the breaker, where the particular switchgear operation command is generated based at least in part upon user interaction with the icon. In another example, an interactive icon can include an alarm access icon that can provide user access to a log of historical alarm event occurrences associated with the power distribution system, switchgear controller device, etc. In a further example, an interactive icon can include a timer access icon that can provide user access to functional timers associated with the switchgear control module, including access to change characteristics associated with the functional timers, including predetermined periods of elapsed time associated with one or more functional timers. Various icons may enable user access based at least in part upon receiving one or more particular user passwords. For example, an icon may include a login icon that can receive a user-provided password to authenticate the user and unlock access to interact with various interactive icons.

At 912, a scrolling alarm list is generated. The scrolling alarm list may include a scrolling list of a selection of alarm event occurrences associated with the power distribution system, switchgear controller device, etc. The list may update to include the most recent alarm event occurrence with a new entry indicating various characteristics associated with the alarm event, including a time of occurrence and description of the alarm event. The most recent alarm event occurrence entry may be highlighted distinct from other occurrence entries in the scrolling list. Such highlighting may include making the most recent entry flash one or more various colors, luminosities, etc. relative to the other entries in the list. Alarm event occurrences that predate the most recent alarm event occurrence may be removed from the scrolling list. Historical alarm event occurrences, including alarm event occurrences removed from the scrolling list, may be stored in a common alarm log.

In some embodiments, generating a scrolling alarm list includes generating an interactive alarm acknowledgement icon. The icon can generate an acknowledgment signal upon user interaction with the icon. Such an acknowledgement signal can disable highlighting of a most recent alarm event occurrence entry.

At 920, additional operations may be performed, as discussed further below.

Figure 10:
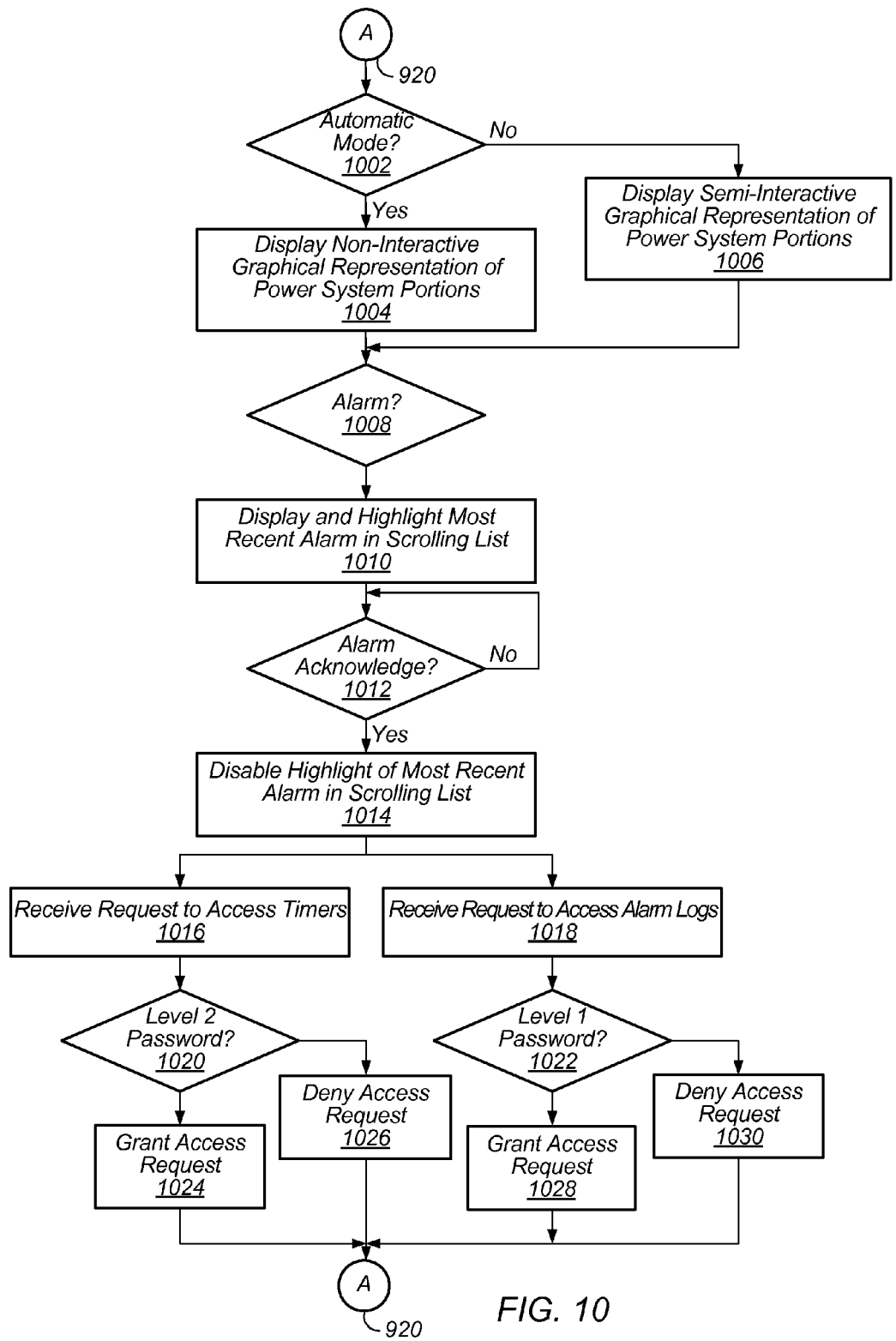
FIG. 10 illustrates presenting interactive and non-interactive elements via a human machine interface and providing user access to elements associated with the switchgear controller device based at least in part upon user interaction with the interactive elements, according to some embodiments.

FIG. 10 illustrates presenting interactive and non-interactive elements via a human machine interface and providing user access to elements associated with the switchgear controller device based at least in part upon user interaction with the interactive elements, according to some embodiments.

At 1002, a determination is made regarding whether the switchgear controller device is presently in an automatic mode. If so, at 1004, a non-interactive graphical representation of the power distribution system, discussed above with reference to FIG. 9, is displayed via a user interface, including a HMI. If not, at 1006, a semi-interactive graphical representation of the power distribution system is displayed. A semi-interactive graphical representation can include a fully non-interactive graphical representation. In some embodiments, a semi-interactive graphical representation of a power distribution system includes interactive graphical representations of one or more components included in one or more particular portions of the power distribution system and non-interactive graphical representations of one or more components including in one or more other particular portions of the power distribution system. For example, graphical representations of components in a downstream portion of the power distribution system may remain non-interactive regardless of the operating mode at 1002, while one or more graphical representations of components in an upstream portion, including icons associated therewith, may be interactive or non-interactive based at least in part upon whether the switchgear controller device is in a manual or automatic mode, respectively.

In some embodiments, data associated with a graphical representation may indicate whether the representation is to be interactive when the switchgear controller device is in a particular operating mode, particular commands that are associated with the representation based at least in part upon particular configurations of various components, systems, etc. in the power distribution system, some combination thereof, or the like, including present operating mode.

At 1008 and 1010, if an alarm event is determined to have occurred, the most recent alarm event occurrence is displayed in an entry in a scrolling alarm list. The most recent entry may be highlighted to distinguish it against predating alarm event occurrences. The alarm event may be determined to have occurrence based at least in part upon analysis of data received from one or more portions of the power distribution system.

At 1012 and 1014, if an acknowledgment signal is received, a highlighting of an entry for the most recent alarm event occurrence in the scrolling list is disabled. The acknowledgment signal may be received based at least in part upon a user-initiated interaction with an interactive alarm acknowledgment icon.

At 1016, a request to access one or more functional timers associated with the switchgear controller device is received.

The request may be received based at least in part upon a user-initiated interaction with a displayed interactive icon on the HMI, where the icon is associated with access to the functional timers. As shown at 102, 1024, 1026, based at least in part upon receipt of the access request, access to the functional timers may be granted based at least in part upon a determination that the requesting user has provided one or more particular passwords that authenticate the user as having a sufficient level of authorization to access the functional timers. For example, as shown at 1020, access to the timers may depend at least partially upon the user having provided, via the HMI, a "level 2" password that enables the user to access various aspects of the switchgear controller device, above and beyond access granted to users having provided other types of passwords, including "level 1" passwords. As a further example, if the user provides a level 1 password at 1020, the user may be denied access to the timers at 1026, although the user may be granted access to other aspects of the switchgear controller device, including access to interact with graphical representations of the power distribution system to command the switchgear controller device to generate commands to various components. In some embodiments, passwords may be received via user interaction with a separate interactive icon displayed on the HMI, including a "login" icon.

In some embodiments, granting access to functional timers at 1024 includes displaying various aspects of the various functional timers associated with the switchgear controller device via the HMI.

At 1018, a request to access one or more alarm logs associated with the switchgear controller device is received. The request may be received based at least in part upon a user-initiated interaction with a displayed interactive icon on the HMI, where the icon is associated with access to one or more logs of historical alarm event occurrences. As shown at 1022, 1028, 1030, based at least in part upon receipt of the access request, access to the alarm logs may be granted based at least in part upon a determination that the requesting user has provided one or more particular passwords that authenticate the user as having a sufficient level of authorization to access the functional timers. For example, as shown at 1022, access to the timers may depend at least partially upon the user having provided, via the HMI, a "level 1" password that enables the user to access at least some aspects of the switchgear controller device and restricts the user from accessing at least some other aspects of the switchgear controller device, including functional timers. As a further example, if the user provides a level 2 password at 1020, the user may be granted access to the timers at 1026.

Figure 11:
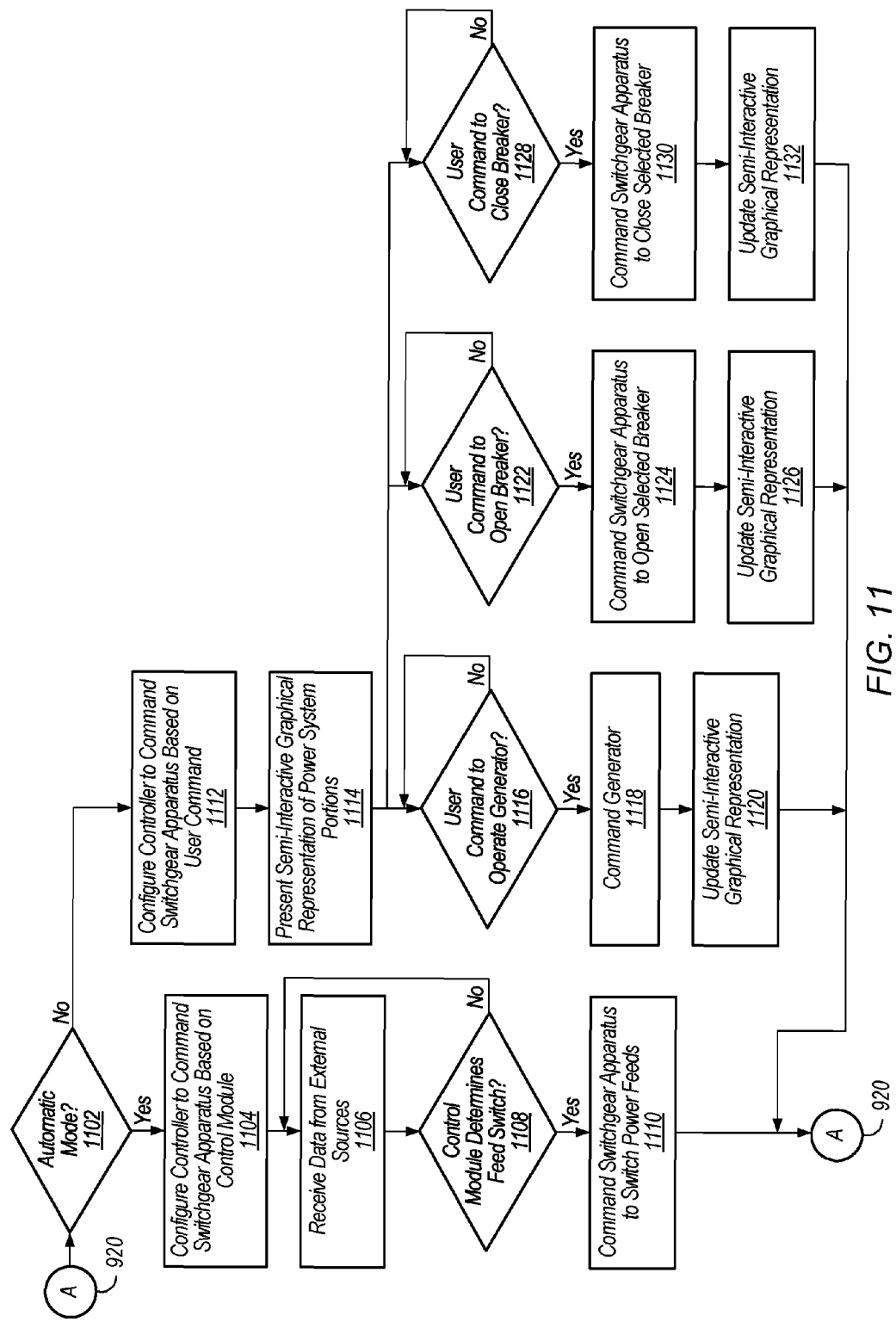
FIG. 11 illustrates generating various commands to devices external from the switchgear controller device and updating graphical representations presented via a human machine interface of the switchgear controller device based at least in part upon various inputs and device configurations, according to some embodiments.

FIG. 11 illustrates generating various commands to devices external from the switchgear controller device and updating graphical representations presented via a human machine interface of the switchgear controller device based at least in part upon various inputs and device configurations, according to some embodiments.

At 1102, a determination is made regarding whether the switchgear controller device is in an automatic operating mode. The determination may be made based at least in part upon signals received from an operating mode selection interface of the switchgear controller device, where the operating mode selection interface may generate an operating mode signal that indicates a selected operating mode.

At 1104, if the switchgear controller device is operating in an automatic operating mode, the controller device is configured to command at least the switchgear apparatus based at least in part upon determinations made by one or more portions of the switchgear control module. The one or more portions of the control module may be configured, in an automatic mode, to generate output signals, including one or more various operation commands to various external components and systems, based at least partially upon analysis of data received at the switchgear controller device from one or more external components or systems, including one or more components of a power distribution system. The one or more portions of the control module may be configured, in an automatic mode, to generate output signals, including one or more various operation commands to various external components and systems, independent of user-initiated commands regarding commands to the various external components and systems. For example, user-initiated interactions with graphical representations on an HMI to command the switchgear controller device to generate one or more particular operation commands may be ignored when the switchgear controller device is operating in automatic operating mode.

At 1106, data is received from one or more external sources. The external sources can include one or more portions of a power distribution system to which the switchgear controller device is communicatively coupled. For example, data may be received from one or more components of a switchgear apparatus of the system, an upstream portion of the system that is upstream of the switchgear apparatus, and a downstream portion of the system that is downstream of the switchgear apparatus. In some embodiments, the received data is analyzed by one or more portions of the switchgear control module to arrive at one or more various determinations regarding the present configuration of various portions of the power distribution system. The control module may make one or more determinations regarding operations to be performed by one or more components in the power distribution system, including one or more components of the switchgear apparatus, based at least in part upon the one or more various determinations regarding the present configuration of various portions of the power distribution system.

At 1108 and 1110, if one or more portions of the control module arrives at one or more particular determinations regarding one or more portions of the power distribution system, where the one or more particular determinations is associated with a command to one or more components of the switchgear apparatus to perform a switching operation between power feeds, a switchgear operation command may be generated to transmit to the switchgear apparatus to perform the particular switching operation. For example, where the control module determines that the switchgear apparatus is to perform a switching operation to switch from a utility power feed to a backup power feed, a switchgear operation command that commands the switchgear apparatus to switch from the utility power feed to the back-up power feed may be generated.

In some embodiments, a switchgear operation command may include multiple separate commands. For example, where a switchgear apparatus is configured to perform open-transition switching operations, where one circuit breaker routing one power feed opens before another circuit breaker closes to route another power feed, a generated switchgear operation command may include a command to initially open a particular breaker and subsequently close another particular breaker.

At 1112, if the switchgear controller device is not operating in an automatic operating mode, the controller device is configured to command at least the switchgear apparatus based at least in part upon user-initiated commands to the switchgear controller device. Such commands may include input signals generated based at least in part upon user-initiated interaction with one or more elements of a user interface, where the elements are associated with one or more particular user commands. One or more portions of the switchgear control module may be configured, in an operating mode other than an automatic mode, including a manual mode, to generate particular output signals, including one or more particular operation commands to various external components and systems, based at least partially upon receiving one or more various user commands to generate the particular output signals. The one or more portions of the control module may be configured, in a non-automatic mode such as a manual operating mode, to generate output signals, including one or more particular operation commands to various external components and systems, independent of determinations made by one or more portions of the switchgear control module based at least in part upon analysis of data received from one or more external components or systems of the power distribution system.

At 1114, a semi-interactive graphical representation of one or more portions of the power distribution system is presented to a user via a user interface. The presenting may include displaying one or more graphical representations via a visual display interface in an HMI. A semi-interactive graphical representation may include interactive graphical representations of some components of the power distribution system and non-interactive graphical representations of other particular components of the power distribution system. For example, a graphical representation of a generator in an upstream portion of the power distribution system and various circuit breakers in a switchgear apparatus may be interactive, where a user can interact with the representations to input particular user commands associated with the particular components associated with the representation. In another example, a graphical representation of a UPS in a downstream portion of the power distribution system may be non-interactive.

In some embodiments, one or more of the graphical representations indicate a present configuration of the one or more components or systems in the power distribution system. For example, an interactive graphical representation of a generator in a power distribution system, in addition to being associated with a particular user command, may include a graphical representation of a present configuration of the generator, including on-line, off-line, in automatic operating mode, in manual operating mode, in failure mode, some combination thereof, or the like.

At 1116-1118, if a user command for a generator power source for a back-up power feed to perform one or more particular operations is received, a particular generator operation command is generated for transmission, where the particular generator operation command, upon receipt by the generator, can be executed by the generator to perform the one or more particular operations in the user command. The user command may be received as a particular input signal generated based at least in part upon a user-initiated interaction with a particular interactive graphical representation displayed in the HMI, where the particular interactive graphical representation is associated with the particular user command. For example, an interactive graphical representation of a generator may be associated with a user command to start the generator, and a user interaction with the graphical representation of the generator can result in a user command to start the generator.

At 1120, the semi-interactive graphical representation is updated based at least in part upon the generated generator operation command. For example, where a generator operation command to start an off-line generator is generated, a semi-interactive graphical representation of the power distribution system that includes a graphical representation of the generator in an off-line operating mode may be updated to be a semi-interactive graphical representation of the power distribution system that includes a graphical representation of the generator in an on-line operating mode.

At 1122-1124, if a user command for a circuit breaker for a power feed to a switchgear apparatus to switch from a closed configuration to an open configuration is received, a switchgear operation command for that circuit breaker to open is generated for transmission, where the particular generator operation command, upon receipt by at least a portion of the switchgear apparatus, can be executed by the switchgear apparatus to open the particular circuit breaker. The user command may be received as a particular input signal generated based at least in part upon a user-initiated interaction with a particular interactive graphical representation displayed in the HMI, where the particular interactive graphical representation is associated with the particular user command to open the particular breaker. For example, an interactive graphical representation of the circuit breaker may represent the breaker as being closed and may be associated with a user command to open the closed breaker, and a user interaction with the graphical representation of the circuit breaker can result in a user command to open the breaker.

At 1126, the semi-interactive graphical representation is updated based at least in part upon the generated switchgear operation command. For example, where a generator operation command to open a closed breaker is generated, a semi-interactive graphical representation of the power distribution system that includes a graphical representation of the breaker in a closed configuration may be updated to be a semi-interactive graphical representation of the power distribution system that includes a graphical representation of the breaker in an open configuration.

At 1128-1130, if a user command for a circuit breaker for a power feed to a switchgear apparatus to switch from an open configuration to a closed configuration is received, a switchgear operation command for that circuit breaker to close is generated for transmission, where the particular generator operation command, upon receipt by at least a portion of the switchgear apparatus, can be executed by the switchgear apparatus to close the particular circuit breaker. The user command may be received as a particular input signal generated based at least in part upon a user-initiated interaction with a particular interactive graphical representation displayed in the HMI, where the particular interactive graphical representation is associated with the particular user command to close the particular breaker. For example, an interactive graphical representation of the circuit breaker may represent the breaker as being open and may be associated with a user command to close the closed breaker, and a user interaction with the graphical representation of the circuit breaker can result in a user command to close the breaker.

At 1132, the semi-interactive graphical representation is updated based at least in part upon the generated switchgear operation command. For example, where a generator operation command to close a closed breaker is generated, a semi-interactive graphical representation of the power distribution system that includes a graphical representation of the breaker in an open configuration may be updated to be a semi-interactive graphical representation of the power distribution system that includes a graphical representation of the breaker in a closed configuration.

In some embodiments, updating a graphical representation of a power distribution system includes updating the user commands associated with one or more particular graphical representations. For example, where a switchgear operation command to open a particular closed breaker is generated at 1124, updating the graphical representation at 1126 can include disassociating a graphical representation of the breaker from a user command to open the breaker and associating the graphical representation to close the breaker. In addition, where a switchgear operation command to close a particular closed breaker is generated at 1130, updating the graphical representation at 1132 can include disassociating another graphical representation of another circuit breaker from a user command to close that breaker, such that both breakers are not closed in parallel.

Figure 12:
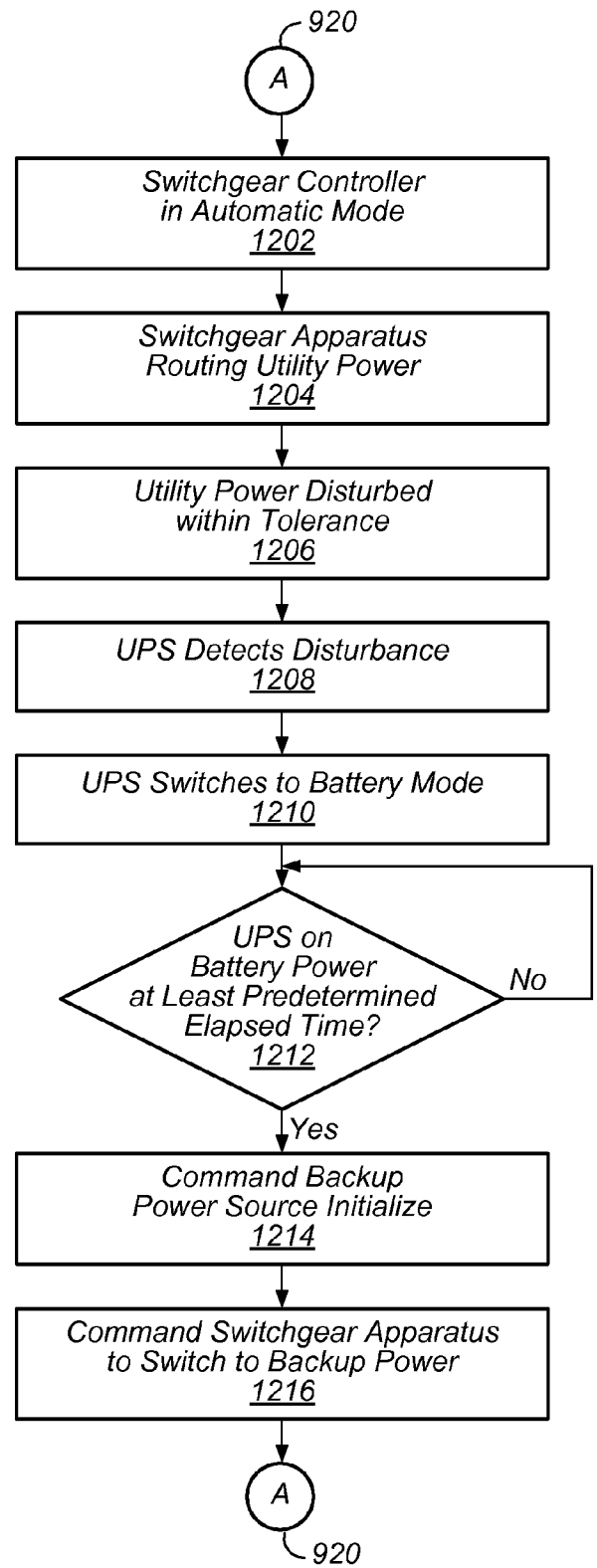
FIG. 12 illustrates generating commands to devices external from the switchgear controller device according to some embodiments.

FIG. 12 illustrates generating commands to devices external from the switchgear controller device according to some embodiments.

In some embodiments, one or more portions of a switchgear controller device generates particular output signals based at least in part upon determinations of one or more particular configurations and conditions of one or more portions of a power distribution system. Output signals can include operation commands to various external components and systems, including external switchgear apparatuses, generators, etc. to perform one or more particular operations.

In some embodiments, determinations of one or more particular configurations and conditions of one or more portions of a power distribution system includes determining an initial present configuration of one or more portions of the power distribution system and determining, based at least in part upon analysis of data received from one or more portions of the power distribution system, that the one or more portions are in one or more subsequent present configurations. The determining may further include generating one or more particular output signals based at least in part upon determining that the one or more portions are in one or more subsequent present configurations.

In the illustrated embodiment shown in FIG. 12, for example, one or more portions of a switchgear controller device, including one or more portions of a switchgear control module, can monitor data received from at least a downstream portion of a power distribution system to which the switchgear controller device is coupled, where the downstream portion includes a UPS. The UPS may include various components, including one or more batteries, an inverter, a rectifier, and a UPS bypass circuit. The UPS may operate in one or more particular operating modes, including a normal operating mode where the UPS routes power received from the external switchgear apparatus to the downstream electrical load via the rectifier and inverter; a bypass operating mode where power from an external switchgear apparatus is routed to the downstream electrical load via the bypass circuit; and a battery operating mode where the one or more batteries of the UPS exclusively supply the operating power to the downstream electrical load receives operating power and independently of power distributed from the external switchgear apparatus.

In some embodiments, one or more components or systems associated with the UPS may generate one or more signals indicating which of the particular operating modes the UPS is presently operating in. Such signals may be received at the switchgear controller device and processed by one or more portions of the control module as part of a determination by one or more portions of the control module regarding a present configuration of at least the UPS.

In some embodiments, the UPS can make determinations regarding various characteristics of the power feed being received at the UPS from upstream. The UPS can change its operating mode based at least in part upon the determinations. For example, the UPS may compare one or more characteristics of the received power feed, including voltage, current, etc., against one or more predetermined threshold values. In some embodiments, a pair of a high threshold value and a low threshold value comprises a tolerance band of values for a given characteristic. The UPS may perform one or more operations based at least in part upon a determination that one or more power feed characteristics at least meet one or more predetermined threshold values for the given characteristic, including changing a present operating mode of the UPS.

In some embodiments, a UPS can determine if a power feed characteristic, although within one or more predetermined threshold values, is nonetheless disturbed from values corresponding to a normal operating state of the power feed. For example, where a power feed experiences a voltage drop that nonetheless remains within a tolerance band for voltage values, the power feed may be determined to be disturbed and within tolerance limits.

In some embodiments, a UPS can, based at least in part upon a determination that a power feed is disturbed from a normal operating state and is within a predetermined tolerance band ("range") of values, may perform one or more operations, including changing an operating mode of the UPS. For example, where the UPS is initially operating in a normal operating mode, the UPS may respond to determining that the received power feed is disturbed and within a tolerance range of values, for one or more power feed characteristics, by changing from the normal operating mode to a battery power mode, where the downstream electrical load is isolated from the receive power feed and the UPS supplies the operating power to the load exclusively from one or more batteries of the UPS. In some embodiments, where the UPS switches to battery operating mode under such conditions, and remains in the battery operating mode for more than a predetermined period of elapsed time, the switchgear controller device may respond by generating a switchgear operation command to the switchgear apparatus to switch from the power feed experiencing the disturbance to another power feed.

At 1202, the switchgear controller device is in automatic operating mode, such that output signals are generated by one or more portions of the switchgear controller device based at least in part upon analysis of data received from external components or system and independently of received user commands.

At 1204, one or more portions of the switchgear controller device determine that the switchgear apparatus is routing a utility power feed to the downstream electrical load via a downstream portion of the power distribution system, where the downstream portion includes a UPS. The switchgear controller device may receive data from at least the switchgear apparatus and the UPS regarding present configurations of each of the components.

At 1206, a disturbance of utility power occurs. The disturbance may be of one or more characteristics of the utility power feed, including voltage, current, etc. The disturbance may be detected at the switchgear apparatus and communicated to the switchgear controller device. In some embodiments, the switchgear controller device may respond to receiving data from the switchgear apparatus indicating a disturbance of utility power being routed at the switchgear apparatus.

At 1208, the disturbance of the routed utility power feed is detected at the UPS. Such detection at the UPS may be communicated, in some embodiments, to the switchgear controller device. At 1210, the UPS switches to a battery operating mode. The UPS may have initially been operating in a normal operating mode, and switches to the battery operating mode based at least in part upon the determination that the routed utility power feed, received at the UPS, is disturbed from a normal operating state and within a range of predetermined values comprising a tolerance band. The changed operating mode of the UPS may be communicated to the switchgear controller device.

At 1212, the period of elapsed time during which the UPS is operating in battery operating mode is tracked against a predetermined elapsed time value. One or more portions of the switchgear controller device may, based at least in part upon determining, based on received data, that the UPS has switched to a battery operating mode at 1210, initialize a functional timer and compare the elapse of time of the timer against a predetermined period of elapsed time, which may include a minimum period of elapsed time, a maximum period of elapsed time, etc. associated with at least the UPS switching to a battery operating mode.

Upon a determination, at 1212, that the amount of consecutive time during which the UPS has operated in the battery operating mode at least meets the predetermined period of elapsed time, one or more portions of the switchgear controller device, at 1214, generate a generator operation command to a generator to start up and, at 1216, generate a switchgear operation command to a switchgear apparatus to switch from the utility power feed to the backup power feed supplied by the generator. For example, where the predetermined period of elapsed time associated with the UPS switching to battery operating mode is two minutes of consecutive elapsed time, the switchgear controller device may respond to the UPS being in battery operating mode for at least two minutes by generating a switchgear operating command to the switchgear apparatus. In some embodiments, where the switchgear apparatus is routing at least two particular power feeds, the switchgear controller device can respond to a determination that a UPS is switched to battery operating mode for at least a predetermined period of elapsed time associated with the switch to battery operating mode by generating a command to the switchgear apparatus to switch from routing one particular power feed to routing another particular power feed.

Figure 13:
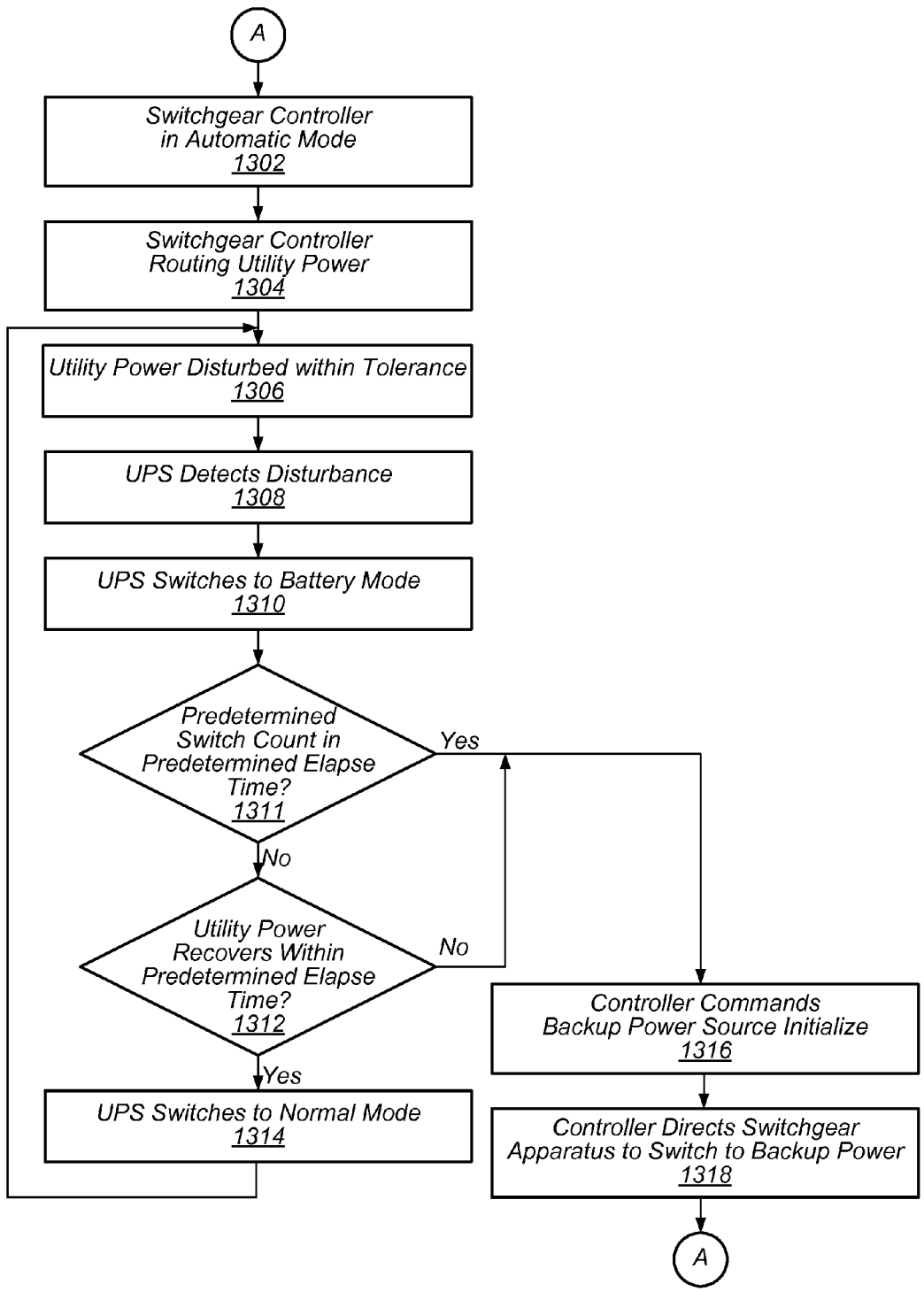
FIG. 13 illustrates generating commands to devices external from the switchgear controller device according to some embodiments.

FIG. 13 illustrates generating commands to devices external from the switchgear controller device according to some embodiments.

In some embodiments, the switchgear controller device monitors changes in operating modes of one or more components of the power distribution system and generates one or more operation commands based at least in part upon a certain number of operating mode changes at one or more particular components within a certain period of elapsed time.

At 1302, the switchgear controller device is in automatic operating mode, such that output signals are generated by one or more portions of the switchgear controller device based at least in part upon analysis of data received from external components or system and independently of received user commands. At 1304, one or more portions of the switchgear controller device determine that the switchgear apparatus is routing a utility power feed to the downstream electrical load via a downstream portion of the power distribution system, where the downstream portion includes a UPS. The switchgear controller device may receive data from at least the switchgear apparatus and the UPS regarding present configurations of each of the components.

At 1306, a disturbance of utility power occurs. The disturbance may be of one or more characteristics of the utility power feed, including voltage, current, etc. The disturbance may be detected at the switchgear apparatus and communicated to the switchgear controller device. In some embodiments, the switchgear controller device may respond to receiving data from the switchgear apparatus indicating a disturbance of utility power being routed at the switchgear apparatus. At 1308, the disturbance of the routed utility power feed is detected at the UPS. Such detection at the UPS may be communicated, in some embodiments, to the switchgear controller device. At 1310, the UPS switches to a battery operating mode. The UPS may have initially been operating in a normal operating mode, and switches to the battery operating mode based at least in part upon the determination that the routed utility power feed, received at the UPS, is disturbed from a normal operating state and within a range of predetermined values comprising a tolerance band. The changed operating mode of the UPS may be communicated to the switchgear controller device.

At 1312 and 1314, if the disturbed utility power feed characteristics subsequently return to values corresponding to a normal operating state within a predetermined amount of time, the UPS may switch back to a normal operating mode. If not, as shown at 1316 and 1318, and as discussed above with reference to FIG. 12, the switchgear controller device may generate operation commands to initialize a back-up power source of a back-up power feed and switch a switchgear apparatus from routing the disturbed power feed to the UPS to routing the back-up power feed to the UPS.

At 1311, where the UPS switches to battery operating mode and subsequently switches to normal operating mode, one or more portion of the switchgear controller device track the number of times the UPS is in battery operating mode within a predetermined period of elapsed time. If, as shown at 1316 and 1318, the UPS switches to battery operating mode at least a certain number of times during a certain consecutive period of time, the switchgear controller device may generate operation commands to initialize a back-up power source of a back-up power feed and switch a switchgear apparatus from routing the disturbed power feed to the UPS to routing the back-up power feed to the UPS. For example, where the predetermined period of elapsed time is two minutes, and the predetermined number of operating mode changes to battery operating mode are three changes, the switchgear controller may generate the commands illustrated at 1316 and 1318 in response to determining that the UPS has switched to battery operating mode at least three separate times within a two-minute consecutive period of elapsed time. In some embodiments, where the switchgear apparatus is routing at least two particular power feeds, the switchgear controller device can respond to a at least a minimum number of separate detections, within a certain predetermined period of elapsed time, that a UPS has switched to battery operating mode, by generating a command to the switchgear apparatus to switch from routing one particular power feed to routing another particular power feed.

Figure 14:
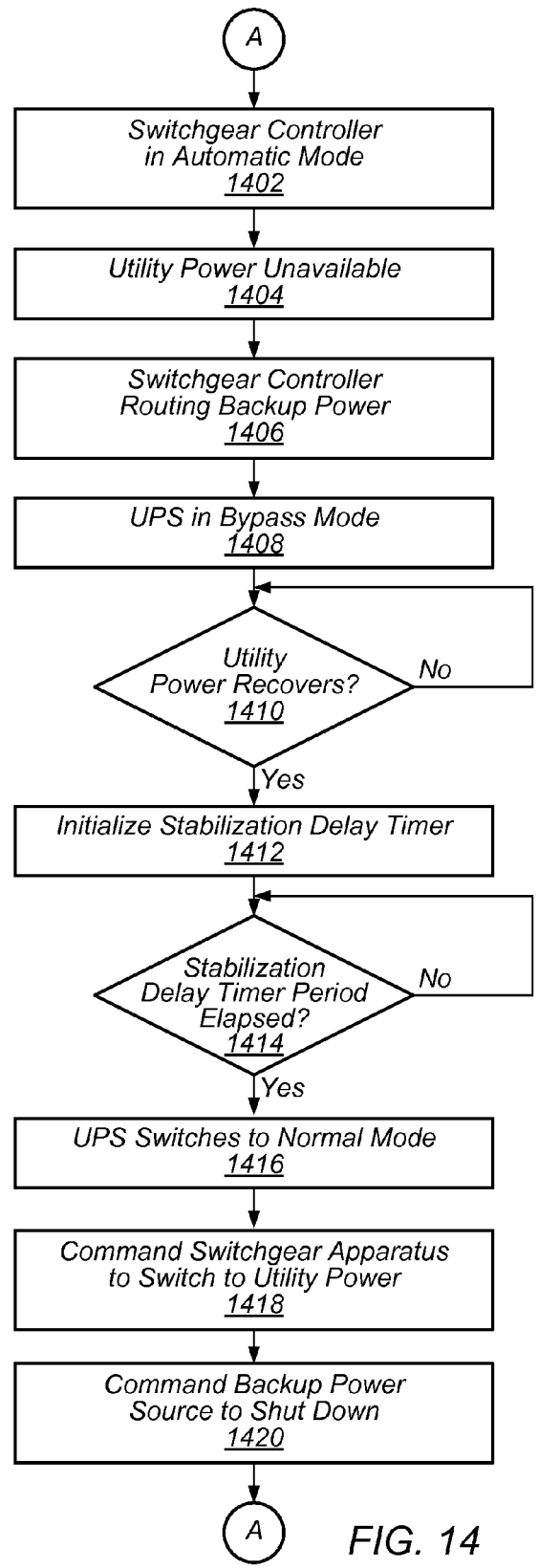
FIG. 14 illustrates generating commands to devices external from the switchgear controller device according to some embodiments.

FIG. 14 illustrates generating commands to devices external from the switchgear controller device according to some embodiments.

In some embodiments, a power distribution system includes a back-up power feed supplied from a back-up power source and a utility power feed supplied from a utility power source, where a switchgear apparatus included in the power distribution system selectively routes one of the utility power feed or the back-up power feed downstream in the power distribution system. A back-up power source can include one or more generators.

In some embodiments, where a utility power feed becomes unavailable, the switchgear apparatus routes the back-up power feed downstream in the power distribution system. Lack of availability of a power feed includes a failure to receive the power feed over the power feed transmission line.

In some embodiments, upon detection that utility power becomes available at the switchgear apparatus, one or more portions of the switchgear controller device may generate a switchgear operation command to the switchgear apparatus to switch to the utility power feed. The utility power feed may be associated with a routing priority, such that the utility power feed is preferentially routed by the switchgear apparatus when the utility power feed is available to be routed.

In some embodiments, when a utility power feed becomes available, the switchgear controller device delays generating a switchgear operation command to the switchgear apparatus to switch to the utility power feed by a certain predetermined period of elapsed time. The delayed generation may enable the switchgear controller device to verify that the newly available utility power feed is exhibits sufficiently stable characteristics to verify, with a certain level of confidence, that the power feed can support one or more downstream electrical loads. As a result, based at least in part upon determining that an initially unavailable utility power feed is available, one or more portions of the switchgear controller device can track the period of elapsed time during which the utility power feed is available and, upon determining that the utility power feed is available and exhibiting power feed characteristics within one or more predetermined threshold values for at least a predetermined period of elapsed time, generate a switchgear operation command to a switchgear apparatus to switch to the utility power feed.

At 1402, the switchgear controller device is in automatic operating mode, such that output signals are generated by one or more portions of the switchgear controller device based at least in part upon analysis of data received from external components or system and independently of received user commands. At 1404, one or more portions of the switchgear controller device determine that the utility power feed in the power distribution system is unavailable to at least the switchgear apparatus. At 1406, one or more portions of the switchgear controller device determines that the switchgear apparatus is routing a back-up power feed supplied by a back-up power source to the downstream electrical load via a downstream portion of the power distribution system, where the downstream portion includes a UPS. The switchgear controller device may receive data from at least the switchgear apparatus and the UPS regarding present configurations of each of the components. At 1408, one or more portions of the switchgear controller device determine that the UPS is in a bypass operating mode.

At 1410 and 1412, based at least in part upon a determination that the utility power feed subsequently becomes available ("recovers"), a functional timer associated with a stabilization delay is initialized. The timer may be initialized by one or more portions of the switchgear controller device. The stabilization delay may include a predetermined period of elapsed time associated with determining that a recovered power feed is stable.

At 1414 and 1416, upon a determination that the initialized timer has counted a period of elapsed time that at least meets the stabilization delay, the UPS switches to normal operating mode. The UPS may switch to a bypass operating mode based at least in part upon receiving power from a back-up power source and may switch to a normal operating mode based at least in part upon receiving power from a particular power feed, including a utility power feed.

At 1418, one or more portions of the switchgear controller device generates a switchgear operation command to the switchgear apparatus to switch to the utility power feed. In some embodiments, the switchgear operation command may be generated based at least in part upon a determination that the UPS is operating in the normal operating mode. The switchgear controller device may generate a switchgear operation command, generator operation command, etc. based at least in part upon determinations regarding the present operating mode of the UPS, including generating a switchgear operation command to switch from utility power to back-up power and generating a generator operation command to start the generator based at least in part upon determining that the UPS has switched away from a normal operating mode to one or more various operating modes. In some embodiments, the switchgear operation command may be generated based at least in part upon a determination that the utility power feed characteristics remain within one or more threshold values during the stabilization delay; else the one or more portions of the switchgear controller device may re-set the stabilization timer.

In some embodiments, generation of a switchgear operation command may be inhibited based at least in part upon a present operating mode of the UPS. For example, generation of a switchgear operation command to switch to utility power may be inhibited, even where utility power is available, based at least in part upon the UPS being in an operating mode other than the normal operating mode, including bypass operating mode, battery operating mode, etc.

At 1420, the one or more portions of the switchgear controller device generate an operation command to the back-up power source to shut down.

Figure 15:
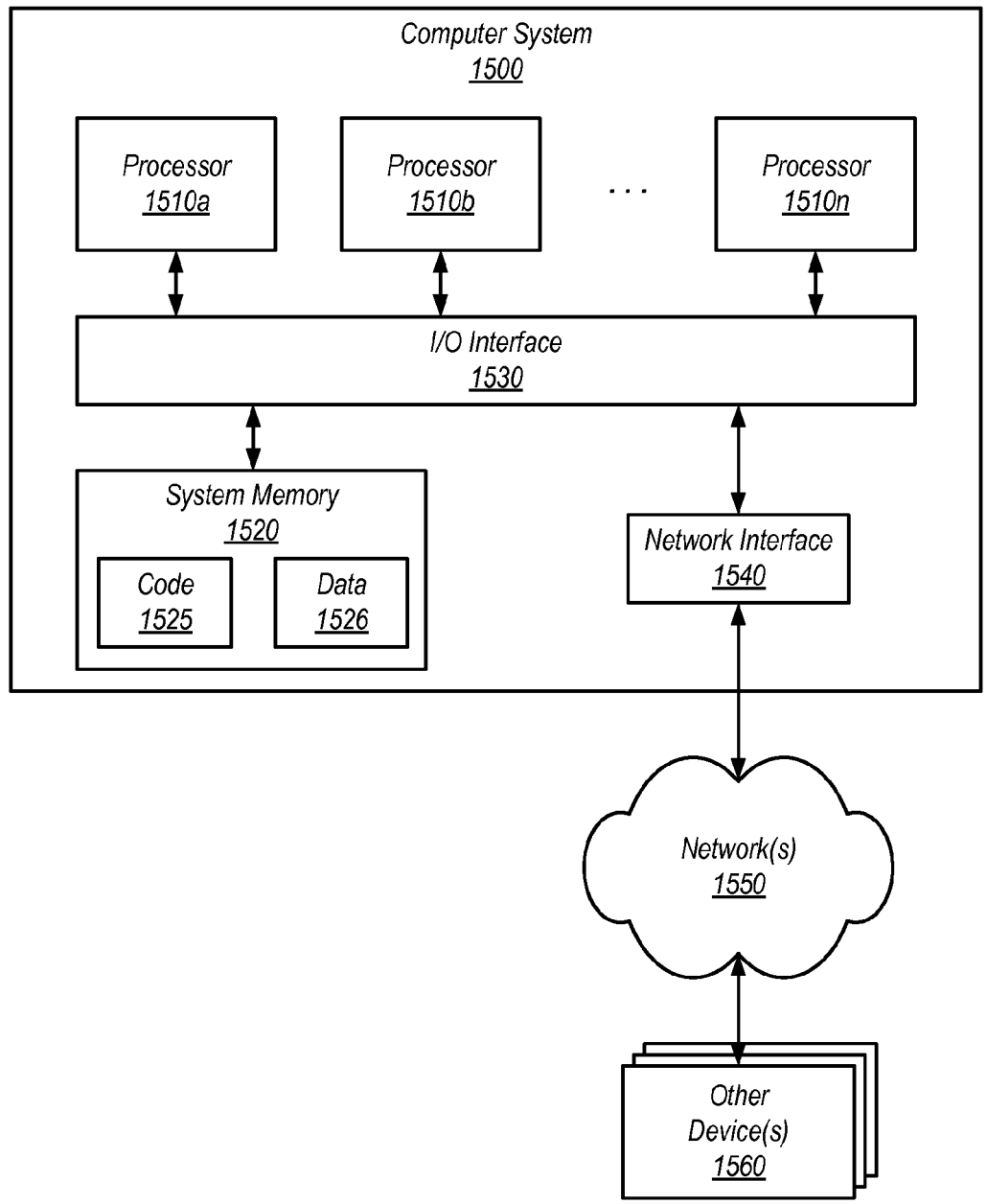
FIG. 15 is a block diagram illustrating an example computer system that may be used in some embodiments.

FIG. 15 is a block diagram illustrating an example computer system that may be used in some embodiments.

In some embodiments, a system that implements a portion or all of one or more of the technologies, including but not limited to one or more portions of the power distribution systems, one or more components included in the one or more portions, one or more portions of a switchgear controller device communicatively coupled to the one or more portions, and various power management methods, systems, devices, and apparatuses as described herein, may include a general-purpose computer system that includes or is configured to access one or more computer-accessible media, such as computer system 1500 illustrated in FIG. 15. In the illustrated embodiment, computer system 1500 includes one or more processors 1510 coupled to a system memory 1520 via an input/output (I/O) interface 1530. In some embodiments, computer system 1500 further includes a network interface 1540 coupled to I/O interface 1530. In some embodiments, computer system 1500 is independent of a network interface and can include a physical communication interface that can couple with a communication pathway, including a communication cable, power transmission line, etc. to couple with various external components, systems, etc.

In various embodiments, computer system 1500 may be a uniprocessor system including one processor 1510, or a multiprocessor system including several processors 1510 (e.g., two, four, eight, or another suitable number). Processors 1510 may be any suitable processors capable of executing instructions. For example, in various embodiments, processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

System memory 1520 may be configured to store instructions and data accessible by processor(s) 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as a portion or all of the power distribution systems, one or more components included in the one or more portions, one or more portions of a switchgear controller device communicatively coupled to the one or more portions, and various power management methods, systems, devices, and apparatuses as described herein, are shown stored within system memory 1520 as code 1525 and data 1526.

In one embodiment, I/O interface 1530 may be configured to coordinate I/O traffic between processor 1510, system memory 1520, and any peripheral devices in the device, including network interface 1540 or other peripheral interfaces. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices 1560 attached to a network or networks 1550, such as other computer systems or devices as illustrated in FIGS. 1 through 15, for example. In various embodiments, network interface 1540 may support communication via any suitable wired or wireless general data networks, such as types of Ethernet network, for example. Additionally, network interface 1540 may support communication via telecommunications/telephony networks such as analog voice networks or digital fiber communications networks, via storage area networks such as Fibre Channel SANs, or via any other suitable type of network and/or protocol.

In some embodiments, system memory 1520 may be one embodiment of a computer-accessible medium configured to store program instructions and data for implementing embodiments of power management methods as described above relative to FIGS. 1-14. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1500 via I/O interface 1530. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1500 as system memory 1520 or another type of memory. Further, a computer-accessible medium may include transmission media or signals such as electrical, electromagnetic, or digital signals, conveyed via a communication medium such as a network and/or a wireless link, such as may be implemented via network interface 1540.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for performing computing operations in a data center, the system comprising:
one or more computing systems configured to perform computing operations;
a utility power transformer configured to transform and supply a utility power feed received from a utility power source;
a back-up power source configured to supply a back-up power feed;
an external switchgear apparatus configured to, based upon one or more received operating commands, selectively route one of the utility power feed or the back-up power feed to the one or more computing systems, wherein the external switchgear apparatus includes at least a generator breaker associated with a generator of the back-up power feed, and a utility breaker associated with the utility power feed; and
a switchgear controller device that is separate from the external switchgear apparatus and is communicatively coupled to at least the external switchgear apparatus, wherein the switchgear controller device is configured to selectively switch between:
in a particular operating mode, transmitting operating commands to at least the external switchgear apparatus based at least in part upon a switchgear control module device and independent of any commands from a user, and,
in another separate operating mode, transmitting operating commands to at least the external switchgear apparatus based upon one or more commands received from a user via a user interface and independent of the switchgear control module device, wherein the operating commands include a particular operating command to route the utility power feed to the one or more computing systems by at least changing a state of the utility breaker, and a different operating command to route the back-up power feed to the one or more computing systems by at least changing a state of the generator breaker.

2. The system of claim 1, the switchgear controller device comprising:
at least two redundant power supply units each configured to distribute power from separate redundant external power supplies to support at least the switchgear control module device; and
an internal uninterruptible power supply unit configured to at least supply power from an internal power source to at least the switchgear control module device in response to a loss of power from each of the at least two redundant power supply units.

3. The system of claim 1, wherein:
the switchgear controller device is further communicatively coupled to at least one downstream portion of a power distribution system, wherein the downstream portion is downstream of the external switchgear apparatus and upstream of the one or more computer systems, and
the switchgear controller device is configured to receive, from the at least one downstream portion, data indicating a present configuration of the at least one downstream portion of the power distribution system.

4. The system of claim 3, wherein:
the at least one downstream portion of the power distribution system includes one or more uninterruptible power supply (UPS) units configured to supply power to the one or more computer systems and to receive, from the at least one downstream portion, data indicating a present configuration of the at least one downstream portion, and
the switchgear controller device is configured to receive signals indicating one of a plurality of operating modes including:
a normal operating mode wherein the one or more UPSs are routing power received from the external switchgear apparatus to the one or more computer systems;
a bypass operating mode wherein power from the external switchgear apparatus is routed to the one or more computer systems via a bypass of the one or more UPSs; and
a battery operating mode wherein the one or more computer systems receive operating power from one or more battery systems in the one or more UPSs and independently of power distributed from the external switchgear apparatus.

5. An apparatus, comprising:
a switchgear controller device that is communicatively coupled to at least an external switchgear apparatus that includes at least a generator breaker associated with a generator of a back-up power feed and a utility breaker associated with a utility power feed to a downstream electrical load, wherein the switchgear controller device is configured to transmit operating commands to the external switchgear apparatus to command the external switchgear apparatus to switch between routing one of at least two separate power feeds to the downstream electrical load, wherein the switchgear controller device comprises:
a user interface configured to receive user-initiated commands associated with at least the switchgear controller device;
a switchgear control module device configured to, based at least in part upon data received from at least the external switchgear apparatus, make one or more determinations regarding a state of at least two separate power feeds received at the external switchgear apparatus; and
an operating mode selection interface configured to, based at least in part upon a user-initiated command, selectively switch the switchgear controller device between the following operating modes:
in a particular operating mode, transmitting operating commands to at least the external switchgear apparatus based at least in part upon determinations by the switchgear control module device and independent of any user-initiated commands, and,
in another separate operating mode, transmitting operating commands to at least the external switchgear apparatus based upon one or more user-initiated commands received via a user interface and independent of the switchgear control module device, wherein the operating commands include a particular operating command to route the utility feed to the downstream electrical load by at least changing a state of the utility breaker, and another operating command to route the back-up feed to the downstream electrical load by at least changing a state of the generator breaker.

6. The apparatus of claim 5, the switchgear controller device comprising:
at least two redundant power supply units each configured to distribute power from separate redundant external power supplies to support at least the switchgear control module device; and
an internal uninterruptible power supply unit configured to at least supply power from an internal power source to at least the switchgear control module device in response to a loss of power from each of the at least two redundant power supply units.

7. The apparatus of claim 5, wherein:
the switchgear controller device is further communicatively coupled to at least one downstream portion of a power distribution system, wherein the downstream portion is downstream of the external switchgear apparatus and upstream of the downstream electrical load, and
the switchgear controller device is configured to receive, from the at least one downstream portion, data indicating a present configuration of the at least one downstream portion of the power distribution system.

8. The apparatus of claim 7, wherein:
the at least one downstream portion of the power distribution system includes one or more uninterruptible power supply (UPS) units configured to supply power to the one or more computer systems; and
to receive, from the at least one downstream portion, data indicating a present configuration of the at least one downstream portion, the switchgear controller device is configured to receive signals indicating one of a plurality of operating modes associated with the UPS including:
- a normal operating mode where the one or more UPSs are routing power received from the external switchgear apparatus to the downstream electrical load;
- a bypass operating mode where power from the external switchgear apparatus is routed to the downstream electrical load via a bypass of the one or more UPSs; and
- a battery operating mode where the downstream electrical load receives operating power from one or more battery systems in the one or more UPSs and independently of power distributed from the external switchgear apparatus.

9. The apparatus of claim 8, wherein:
the switchgear control module device is configured to:
- determine, based at least in part upon data received from the downstream portion, that the UPS is in the battery operating mode more than a predetermined period of elapsed time based at least in part upon a detection, at the UPS, that one or more characteristics of the power routed to the UPS, from a particular power feed via the external switchgear apparatus, is disturbed from a normal operating state and is within a predetermined tolerance range of values; and
- generate, based at least in part upon the determining, an operating command to the external switchgear apparatus to switch between routing the particular power feed to routing another particular power feed.

10. The apparatus of claim 8, wherein:
the switchgear control module device is configured to:
- determine, based at least in part upon data received from the downstream portion, that the UPS has switched between the battery operating mode and the normal operating mode more than a predetermined number of times within a predetermined period of elapsed time based at least in part upon multiple separate respective detections, at the UPS and for each switch between the battery operating mode and the normal operating mode, that one or more characteristics of the power routed to the UPS, from a particular power feed via the external switchgear apparatus, is disturbed from a normal operating state and is within a predetermined tolerance range of values; and
- generate, based at least in part upon the determining, an operating command to the external switchgear apparatus to switch between routing the particular power feed to routing another particular power feed.

11. The apparatus of claim 8, wherein:
to command the external switchgear apparatus to switch between routing one of at least two separate power feeds to a downstream electrical load, the switchgear controller device is configured to command the external switchgear apparatus to switch between routing one of a utility power feed from a utility power source or a back-up power feed from a generator; and
the switchgear control module device is configured to:
- initially determine, based at least in part upon data received from the downstream portion and the external switchgear apparatus, that the external switchgear apparatus is routing the back-up power feed to the downstream electrical load, the utility power feed is not being received at the external switchgear apparatus, and the UPS is in the bypass operating mode;
- subsequently determine, based at least in part upon data received from the external switchgear apparatus, that the utility power feed is subsequently being received at the external switchgear apparatus; and
- generate, based at least in part upon the subsequent determination, an operating command to the external switchgear apparatus to switch from routing the back-up power feed to routing the utility power feed.

12. The apparatus of claim 5, wherein:
the switchgear controller device is communicatively coupled to at least an external building management system (BMS) and is configured to transmit one or more status signals to the BMS, wherein the one or more status signals include an indication of a present configuration of at least one portion of the switchgear controller device.

13. The apparatus of claim 5, wherein:
to command the external switchgear apparatus to switch between routing one of at least two separate power feeds to a downstream electrical load, the switchgear controller device is configured to command the external switchgear apparatus to switch between routing one of the utility power feed from the utility power source or the back-up power feed from the generator; and
the switchgear controller device is communicatively coupled to at least the generator and is configured to both receive, from the generator, data indicating a present configuration of the generator and transmit, to the generator, one or more operating commands to start or shut down the generator.

14. A method comprising:
receiving, at a switchgear controller device that is communicatively coupled to an external switchgear apparatus in a power distribution system, and based at least in part upon a user-initiated interaction with a user interface associated with the switchgear controller device, a selection of either a manual operating mode or an automatic operating mode;
configuring the switchgear controller device, based at least in part upon receiving the selection of the automatic operating mode, to transmit operating commands to the external switchgear apparatus, to command the external switchgear apparatus to switch between routing one of at least two separate power feeds to a downstream electrical load, based at least in part upon received data associated with at least one portion of the power distribution system and independent of any user-initiated commands; and
configuring the switchgear controller device, based at least in part upon receiving the selection of the manual operating mode, to transmit operating commands to the external switchgear apparatus, each operating command based on a corresponding user-initiated command received, including a particular user-initiated command to command the external switchgear apparatus to change a state of a first breaker associated with a first power feed to a downstream electrical load, and a different user-initiated command to command the external switchgear apparatus to change a state of a second breaker associated with a second power feed to the downstream electrical load, the user-initiated commands received via another user interface and independent of the received data associated with at least one portion of the power distribution system.

15. The method of claim 14, comprising:
receiving, at the switchgear controller device, data associated with one or more power distribution components that are located downstream of the external switchgear apparatus in the power distribution system, wherein the data includes an indication of a current one of a plurality of operating modes in which the one or more power distribution components are operating; and generating a particular operating command to the external switchgear apparatus to perform a particular switching operation, based at least in part upon the one of the plurality of operating modes included in the received data.

16. The method of claim 15, comprising:

determining, based at least in part upon the received data, that an uninterruptible power supply (UPS) that is downstream of the external switchgear apparatus is in a battery operating mode more than a predetermined period of elapsed time based at least in part upon a detection, at the UPS, that one or more characteristics of power routed to the UPS, from a particular power feed via the external switchgear apparatus, is disturbed from a normal operating state and is within a predetermined tolerance range of values; and generating, based at least in part upon the determining, an operating command to the external switchgear apparatus to switch between routing the particular power feed to routing another particular power feed.

17. The method of claim 15, comprising:

determining, based at least in part upon data received from the downstream portion, that an uninterruptible power supply (UPS) has switched between the battery operating mode and the normal operating mode more than a predetermined number of times within a predetermined period of elapsed time based at least in part upon multiple separate respective detections, at the UPS, and for each switch between the battery operating mode and the normal operating mode, that one or more characteristics of the power routed to the UPS, from a particular power feed via the external switchgear apparatus, is disturbed from a normal operating state and is within a predetermined tolerance range of values; and generating, based at least in part upon the determining, an operating command to the external switchgear apparatus to switch between routing the particular power feed to routing another particular power feed.

18. The method of claim 15, wherein:

generating a particular operating command to the external switchgear apparatus to perform a particular switching operation comprises generating a particular operating command to the external switchgear apparatus to switch between routing one of a utility power feed from a utility power source or a back-up power feed from a generator.

19. The method of claim 18, comprising:

determining, based at least in part upon data received from the external switchgear apparatus and the one or more power distribution components that are located downstream of the external switchgear apparatus, that the power distribution is in a particular present configuration wherein:

the external switchgear apparatus is routing a back-up power feed to a downstream electrical load, a utility power feed is not being received at the external switchgear apparatus, and an uninterruptible power supply (UPS) located downstream of the external switchgear apparatus is operating in a bypass operating mode;

determining, subsequent to determining that the power distribution is in the particular present configuration and based at least in part upon data received from the external switchgear apparatus, that the power distribution is in another particular present configuration wherein the utility power feed is subsequently being received at the external switchgear apparatus; and generating, based at least in part upon determining that the power distribution is subsequently in the other particular present configuration, an operating command to the external switchgear apparatus to switch between routing the back-up power feed to routing the utility power feed.

20. The method of claim 14, comprising:

determining, at the switchgear controller device, a particular failure in at least one of the switchgear controller device or a portion of the power distribution system; and generating a signal to a building management system (BMS), based at least in part upon the determining, wherein the signal includes an indication of the particular failure.

* * * * *